United States Patent
Hayase et al.

(10) Patent No.: US 9,386,322 B2
(45) Date of Patent: Jul. 5, 2016

(54) SCALABLE VIDEO ENCODING METHOD AND DECODING METHOD, APPARATUSES THEREFOR, PROGRAMS THEREFOR, AND STORAGE MEDIA WHICH STORE THE PROGRAMS

(75) Inventors: Kazuya Hayase, Yokosuka (JP); Yukihiro Bandoh, Yokosuka (JP); Seishi Takamura, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1612 days.

(21) Appl. No.: 12/665,884

(22) PCT Filed: Jul. 1, 2008

(86) PCT No.: PCT/JP2008/061926
§ 371 (c)(1),
(2), (4) Date: Dec. 21, 2009

(87) PCT Pub. No.: WO2009/005071
PCT Pub. Date: Jan. 8, 2009

(65) Prior Publication Data
US 2010/0329344 A1 Dec. 30, 2010

(30) Foreign Application Priority Data
Jul. 2, 2007 (JP) ................................ 2007-174161

(51) Int. Cl.
*H04N 19/30* (2014.01)
*H04N 19/137* (2014.01)
(Continued)

(52) U.S. Cl.
CPC ............. *H04N 19/59* (2014.11); *H04N 19/137* (2014.11); *H04N 19/30* (2014.11); *H04N 19/80* (2014.11)

(58) Field of Classification Search
None
See application file for complete search history.

(56) References Cited

U.S. PATENT DOCUMENTS

2006/0215762 A1 9/2006 Han et al.
2006/0245498 A1 11/2006 Lee et al.
(Continued)

FOREIGN PATENT DOCUMENTS

JP H10-32824 2/1998
JP 2006-54802 A 2/2006
(Continued)

OTHER PUBLICATIONS

ITU-T: "Advanced video coding for generic audiovisual services", ITU-T Rec, H.264, pp. 129-132, 2003:.
(Continued)

*Primary Examiner* — Mikhail Itskovich
(74) *Attorney, Agent, or Firm* — Harness, Dickey & Pierce, P.L.C.

(57) ABSTRACT

A scalable video encoding method of performing encoding by predicting an upper-layer signal having a relatively high spatial resolution by means of interpolation using an immediately-lower-layer signal having a relatively low spatial resolution. The method computes a first weighting coefficient for each image area of a predetermined unit size in a search for estimating a motion between an encoding target image area in an upper layer and a reference image area, where the first weighting coefficient is computed based on a brightness variation between an image area, which belongs to an immediately-lower layer and has the same spatial position as the encoding target image area, and the reference image area; and performs a motion estimation using a signal which is obtained by correcting a decoded signal of the reference image area by the first weighting coefficient and functions as an estimated signal in the motion estimation, so as to compute a motion vector. Then the method computes a second weighting coefficient based on a brightness variation between a reference image area indicated by the motion vector and the image area which belongs to the immediately-lower layer and has the same spatial position as the encoding target image area; and determines a signal, which is obtained by correcting a decoded signal of the reference image area by using the second weighting coefficient, to be a compensated signal in motion compensation, which functions as a predicted signal of the encoding target image area.

36 Claims, 20 Drawing Sheets

(51) Int. Cl.
*H04N 19/59* (2014.01)
*H04N 19/80* (2014.01)

(56) References Cited

U.S. PATENT DOCUMENTS

| | | | |
|---|---|---|---|
| 2006/0291562 | A1 | 12/2006 | Lee et al. |
| 2009/0080535 | A1 | 3/2009 | Yin et al. |
| 2009/0207919 | A1 | 8/2009 | Yin et al. |

FOREIGN PATENT DOCUMENTS

| | | |
|---|---|---|
| RU | 2 201 654 C2 | 3/2003 |
| RU | 2005113316 A | 9/2005 |
| RU | 2 282 947 C1 | 8/2006 |
| WO | 2006/109141 A1 | 10/2006 |
| WO | 2006/118383 A1 | 11/2006 |
| WO | 2007/018669 A1 | 2/2007 |
| WO | 2007/018670 A1 | 2/2007 |
| WO | 2007/047271 A2 | 4/2007 |

OTHER PUBLICATIONS

T. Wiegand, G. Sullivan, J. Reichel, H. Schwarz and M. Wien: "Joint Draft 9 of SVC Amendment", ISO/IEC JTC1/SC29/WG11 and ITU-T SG16 Q.6, JVT-V201, pp. 166-170, 2006.

J. Reichel, H. Schwarz and M. Wien: "Joint Scalable Video Model JSVM-8.0", ISO/IEC JTC1/SC29/WG11 and ITU-T SG16 Q.6, JVT-U202, 2006.

G. Bjontegaard: "Calculation of average PNSR differences between RD-curves", ITU-T SG16 Q.6, VCEG, VCEG-M33, pp. 1-4, 2001.

Richardson, Jan, "Video Encoding H.264 and MPEG-4 Standards of New Generation," Moscow: Teknosfera, 2005, pp. 186-202 and 219-224 (pp. 138-153 and 164-169 of translation).

Yin, Peng, et al., "Localized Weighted Prediction for Video Coding," Conference Proceedings of the IEEE International Symposium on Circuits and Systems, May 23-26, 2005, Kobe, Japan, pp. 4365-4368.

Pandit, Purvin, et al., "Weighted Prediction in Scalable Video Coding," Picture Coding Symposium, Apr. 24-26, 2006, Beijing, China.

Kadono, Shinya, et al., "Implicit Weighed Bi-prediction using DC Offset Value," Joint Video Team (JVT) of ISO/IEC MPEG & ITU-T VCEG (ISO/IEC JTC1/SC29/WG11 and ITU-T SG16 Q.6), No. JVT-E077, 5th Meeting: Geneva, Switzerland, Oct. 9-17, 2002.

Kato, Haruhisa, et al., "Weighting Factor Determination Algorithm for H.264/MPEG-4 AVC Weighted Prediction,"2004 IEEE 6th Workshop on Multimedia Signal Proccessing, Siena, Italy, Sep. 29-Oct. 1, 2004, pp. 27-30.

Boyce, Jill M., "Weighted Prediction in the H.264/MPEG AVC Video Coding Standard," Proceedings of the 2004 International Symposium on Circuits and Systems, May 23, 2004, pp. III-789-792.

Kamisli, Fatih, et al., "Estimation of Fade and Dissolve Parameters for Weighted Prediction in H.264/AVC," IEEE International Conference on Image Processing, Sep. 1, 2007, pp. V-285-288.

Hayase, Kazuya, et al., "A Weighted Prediction of Spatial Scalable Video Coding with Inter-Layer Information," Picture Coding Symposium, Lisbon, Portugal, Nov. 7-9, 2007.

Hayase, Kazuya, et al., "Weighted Prediction of Spatial Scalable Video Coding using Inter-Layer Correlation," Sixth Forum on Information Science and Technology, Aug. 22, 2007, pp. 253-256 (plus 11 pages of English translation).

Lee, Kyohyuk, "Extension of weighted prediction to multi layer structure," Joint Video Team (JVT) of ISO/IEC MPEG & ITU-T VCEG, (ISO/IEC JTC1/SC29/WG11 and ITU-T SG16 0.6) JVT-P076, 16th Meeting: Poznan, Poland, Jul. 25-29, 2005.

SCALABLE VIDEO ENCODING METHOD AND DECODING METHOD, APPARATUSES THEREFOR, PROGRAMS THEREFOR, AND STORAGE MEDIA WHICH STORE THE PROGRAMS

TECHNICAL FIELD

The present invention relates to scalable video encoding method and decoding method, apparatuses therefor, programs therefor, and storage media which store the programs.

Priority is claimed on Japanese Patent Application No. 2007-174161, filed Jul. 2, 2007, the contents of which are incorporated herein by reference.

BACKGROUND ART

In ordinary video encoding methods, motion prediction is performed by means of block matching based on minimization of the differences between pixel values between frames, so as to improve encoding performance. However, in an image (having a fading effect or the like) whose brightness temporally varies, the prediction residual increases in accordance with the variation in the brightness, which degrades the encoding performance.

Therefore, H.264/AVC (see Non-Patent Document 1) employs weighted motion prediction for adaptively multiplying a reference picture for the motion prediction by a weighting coefficient. A predicted reference signal, in which the temporal variation in brightness has been corrected, is obtained due to the above weighted motion prediction, thereby improving the encoding performance.

The weighted motion prediction in H.264/AVC has two coefficient transmission modes, such as (i) an Explicit mode for encoding and transmitting the weighting coefficient, and (ii) Implicit mode for indirectly generating a common weighting coefficient between the encoder and the decoder based on information about the reference frame. Table 1 shows the types and prediction methods of the weighted motion prediction for P and B slices.

In Table 1, z represents a weighted motion-predicted signal, y, $y_0$, and $y_1$ represent reference signals for the weighted motion prediction, and w, $w_0$, $w_1$, d, $d_0$ and $d_1$ represents weighting coefficients. Switching operation for the weighted motion prediction and mode selection for the coefficient transmission are performed for each slice.

FIG. 1 is a diagram used for explaining a weighted motion prediction (Implicit mode) in H.264/AVC. The Implicit mode is applied only to the bi-predictive prediction for B slices, and the weighting coefficients are generated in the relevant encoder and decoder, as shown in FIG. 1, where $t_b$ and $t_d$ indicate distances between frames.

Here, it is assumed that the variation in brightness between an encoding target frame and two reference frames is linear. The proportional coefficients $w_0$ and $w_1$ are computed in accordance with the distance from the reference picture. The offset coefficient d is defined to be 0.

$$w_0 = 1 - w_1$$

$$w_1 = t_b / t_d$$

$$d = 0$$

Although FIG. 1 shows an example of proportional coefficient computation by means of interior division in accordance with the distance from the reference picture, a similar operation can be performed when exterior division is employed. If the brightness of the relevant image varies linearly, appropriate weighting coefficients can be computed even in the Implicit mode, and the amount of code required for coefficient information can be reduced.

The same weighted motion prediction is currently employed by JSVC (an extended scalable method) of H.264/AVEX (see Non-Patent Document 2), which is examined in JTD (a joint party of ISO and ITU-T).

The weighted motion prediction shown in Table 1 is also employed in the reference encoder JSVM (program) shown in Non-Patent Document 3.

A technique shown in Patent Document 1 is also known, in which a general variation in luminance of a video image is detected so as to perform luminance compensation. In order to handle a case in which the brightness variation is not constant over the entire image, the technique of Patent Document 1 uses an amount of general variation in luminance over the entire image and applies a flag which indicates whether or not the luminance variation is compensated in each small area.

Non-Patent Document 1: ITU-T: "Advanced video coding for generic audiovisual services", ITU-T Rec, 11.264, pp. 129-132, 2003.

TABLE 1

| Type and methods of weighted motion prediction in H.264/AVC | | | |
|---|---|---|---|
| Type | Prediction type | predicted signal | coefficient transmission |
| P slice | — | $z = w_0 \cdot y_0 + d_0$ | transmit $w_0$ and $d_0$ (Explicit) |
| B slice | L0/L1 prediction | $z = w_0 \cdot y_0 + d_0$ (L0 prediction) | transmit $w_0$, $d_0$, $w_1$, and $d_1$ |
| | | $z = w_1 \cdot y_1 + d_1$ (L1 prediction) | (Explicit) |
| | bi-predictive prediction | $z = w_0 \cdot y_0 + w_1 \cdot y_1 + d$ ($d = \frac{1}{2}(d_0 + d_1)$) | transmit $w_0$, $d_0$, $w_1$, and $d_1$ (Explicit) |
| | | $z = w_0 \cdot y_0 + w_1 \cdot y_1 + d$ | coefficient computation based on distance from reference picture (Implicit) |

Non-Patent Document 2: T. Wiegand, G. Sullivan, J. Reichel, H. Schwarz and M. Wien: "Joint Draft 9 of SVC Amendment", ISO/IFC JTC1/SC29/WG11 and ITU-T SG16 Q.6, JVT-V201, pp. 166-170, 2006.

Non-Patent Document 3: J. Reichel, H. Schwarz and M. Wien: "Joint Scalable Video Model JSVM-8.0", ISO/IEC JTC1/SC29/WG11 and ITU-T SG16 Q.6, JVT-U202, 2006.

Patent Document 1: Japanese Unexamined Patent Application, First Publication No. H10-32824.

DISCLOSURE OF INVENTION

Problem to be Solved by the Invention

As described above, the weighted motion prediction in H.264/AVC is applied to each slice. Therefore, if brightness variation occurs in a part of the slice or is not constant within the slice, the prediction performance of the weighted motion prediction in H.264/AVC degrades. A specific example is a brightness variation due to the shadow of a moving object, which degrades the prediction performance.

If the weighting coefficients are computed for each macroblock which is a smaller unit than the slice, and the weighted motion prediction is executed, the amount of code required for the weighting coefficients considerably increases in the Explicit mode. In such a case, it is preferable to compute the weighting coefficients in the Implicit mode. However, as described above, the Implicit mode of the weighted motion prediction in H.264/AVC is only applied to the bi-predictive prediction for B slices.

Additionally, in the Implicit mode of the weighted motion prediction, the weighting coefficients are computed based on an assumption such that brightness variation over an encoding target frame and two reference frames is linear. Therefore, if the brightness variation over the three frame is non-linear, appropriate weighting coefficients are not computed, which degrades the prediction performance. Specific examples are a fading image having a non-linear variation in brightness or a flash image which includes a flash and has a temporary change in the brightness. JSVC directly employs the weighted motion prediction in H.264/AVC, and thus has the same problems as described above.

In addition, the technique disclosed in Patent Document 1 needs to transmit flag information for each small area, and thus has a problem of a decrease in the encoding performance. Even when the luminance variation for a small area is large and considerably differs from the general luminance variation, the luminance variation for the small area cannot be compensated, thereby degrading the encoding performance.

In light of the above circumstances, an object of the present invention is to establish a design method for a scalable encoder and a scalable decoder used in spatial scalable encoding based on a base layer having the lowest spatial resolution and one or more enhancement layers, each having a resolution higher than that of the base layer, where the design method includes generating a weighting coefficient for weighted motion prediction based on information of a temporal brightness variation between a decoded signal of a reference frame for the motion prediction and a decoded signal of the immediately-lower layer of the encoding target frame, and performing the weighted motion prediction using a common weighting coefficient between the encoder and decoder, without transmitting information of the weighting coefficient.

Means for Solving the Problem

The procedure of the weighted motion prediction of the present invention will be described below.

The weighted motion prediction consists of two steps: one is weighted motion estimation, and the other is weighted motion compensation.

The weighted motion estimation is to search for a motion between a processing target frame and a motion prediction reference frame while correcting the brightness variation between the two frames, and to output motion information obtained by the relevant search as a motion vector.

The weighted motion compensation is to retrieve motion vector information, correct a signal value indicated by the relevant motion vector with respect to brightness variation, and output the corrected signal value as a predicted signal for the processing target frame.

In the encoding process, a motion vector is detected by means of the weighted motion estimation, and the motion vector is retrieved so that the weighted motion compensation is executed.

On the other hand, in the decoding process, encoded data is decoded so as to retrieve the relevant motion vector and execute the weighted motion compensation.

The weighting coefficient computation can be applied to a desired unit image area such as a frame, a slice, a macroblock, or the like.

As the coefficient transmission is unnecessary, every unit image area has the same overhead for the weighted motion prediction. Therefore, the smaller the unit image area, the higher the prediction performance of the weighted motion prediction.

Currently, examples of weighting coefficient computation for each macroblock as a unit are explained. However, another unit image area can be subjected to the weighted motion prediction in accordance with a similar operation. In addition, the operation does not depend on the signal type, that is, a similar operation can be applied to each of the luminance signal and the chrominance signal

Effect of the Invention

In accordance with the present invention, weighting coefficients can be computed for each desired local area. Therefore, even when the brightness changes in a part of an image due to a shadow of an moving object or the like, accurate weighted motion prediction can be embodiment by means of the Implicit mode which performs no weighting coefficient transmission.

Also in the L0/L1 prediction for P and B slices, which conventionally has only the Explicit mode, it is possible to perform weighted motion prediction by means of the Implicit mode.

Additionally, in accordance with the correction in consideration of brightness information of the immediately-lower layer, even for images (e.g., images having a flash and fading images having a non-linear variation) having a non-linear brightness change between an encoding or decoding target frame and prediction reference frames, it is possible to perform weighted motion prediction by means of the Implicit mode. In accordance with such an improvement in the performance of the weighted motion prediction, the encoding efficiency can be improved.

Figure 1:
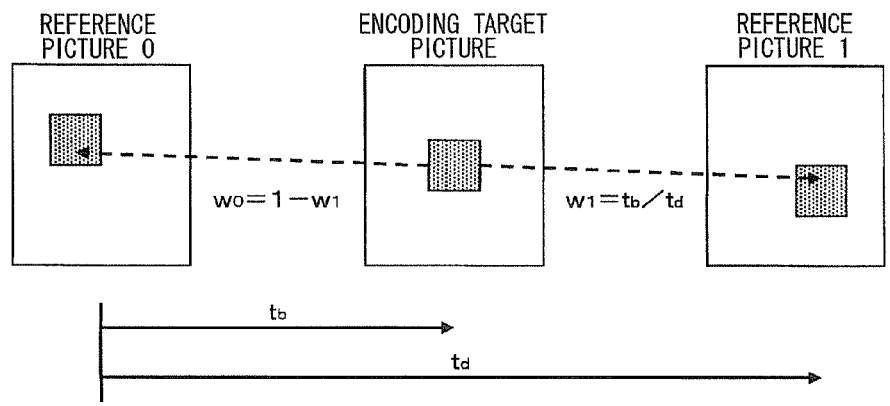
FIG. 1 is a diagram used for explaining a weighted motion prediction (Implicit mode) in H.264/AVC.

101 prediction method determination unit
102 intraframe predictor
103 non-weighted motion predictor
104 interlayer predictor
105 weighted motion estimator
106 weighted motion compensator
107 prediction residual signal generator
108 prediction residual signal encoder
109 decoder
110 relevant enhancement layer decoded signal storage unit
111 immediately-lower layer decoded signal storage unit
201 prediction method decoder
202 prediction mode storage unit
203 prediction method determination unit
204 intraframe predictor
205 non-weighted motion predictor
206 interlayer predictor
207 motion vector information decoder
208 motion vector storage unit
209 weighted motion compensator
210 immediately-lower layer decoded signal storage unit
211 residual signal decoder
212 residual signal storage unit
213 decoded signal generator
214 relevant enhancement layer decoded signal storage unit

BEST MODE FOR CARRYING OUT THE INVENTION

A typical operation in accordance with the present invention will be explained below.

Weighted Motion Estimation

In weighted motion estimation, for each unit image area (e.g., macroblock) in the encoding target frame, a reference frame for the estimation is searched for a matching macroblock.

In the searching operation, every time the target macroblock for the search is changed, a weighting coefficient for indicating brightness variation between the relevant blocks of the frames is computed, and a decoded signal of the target macroblock for the search is corrected by the weighting coefficient. The corrected signal is used as a comparative signal for the matching determination.

The macroblock determined to be the matching block is referred by a motion vector, and functions as a reference macroblock in the motion compensation.

An example device for determining the matching is a determination device using Lagrangian cost minimization for the amount of code and the encoding distortion, as shown in Non-Patent Document 1.

Weighted Motion Compensation

In weighted motion compensation, for each encoding or decoding target macroblock, motion vector information of the target macroblock is restored.

Next, a weighting coefficient for indicating a brightness variation between a reference macroblock designated by the motion vector and the encoding or decoding target macroblock is computed.

The decoded signal of the reference macroblock is corrected using the weighting coefficient, and the corrected signal is used as a predicted signal for the encoding or decoding target macroblock.

Weighting Coefficients Computation

Typically, weighting coefficients used for the weighted motion estimation and the weighted motion compensation for scalable encoding are computed by the procedure explained below.

In the conventional Implicit mode, temporal brightness variation is estimated within a single layer by means of interpolation or extrapolation in accordance with the distance from the reference frame, thereby computing the weighting coefficients.

In the present invention, the temporal brightness variation is estimated using information of a decoded signal of a macroblock in the immediately-lower layer, thereby improving the estimation accuracy.

Before the procedure is explained, signs used for the explanation are shown. An encoding or decoding target frame (called "correction target frame") in the relevant enhancement layer is represented by "f"; a weighted motion estimation or compensation reference frame (called "corrected frame") for P slices and L0 prediction of B slices is represented by "$f_0$"; and the corrected frame for L1 prediction of B slices is represented by "$f_1$".

In addition, a frame in the immediately-lower layer at the same time as the correction target frame f is represented by "g"; a frame in the immediately-lower layer at the same time as the corrected frame $f_0$ is represented by "$g_0$"; and a frame in the immediately-lower layer at the same time as the corrected frame $f_1$ is represented by "$g_1$".

Additionally, a predicted signal value applied to coordinates (i,j) of an encoding or decoding target block (called "correction target block") in frame f is represented by z(i,j); and a decoded signal value at the coordinates (i,j) in a weighted motion estimation or compensation reference block (called "corrected block") of frame $f_0$ is represented by $y_0$(i,j).

Additionally, a decoded signal value at the coordinates (i,j) in a block of frame g, which has the same spatial position as the correction target block of frame f, is represented by x(i,j); and a signal value obtained by subjecting x(i,j) to up sampling for obtaining the resolution of the relevant enhancement layer by means of a specific up-sampling filter is represented by x'(i,j).

Similarly, a decoded signal value at the coordinates (i,j) in a block of frame $g_0$, which has the same spatial position as the corrected block of frame $f_0$, is represented by $x_0$(i,j); and a signal value obtained by subjecting $x_0$(i,j) to up sampling for obtaining the resolution of the relevant enhancement layer by means of a specific up-sampling filter is represented by $x_0$'(i, j).

The methods for obtaining $y_1$(i,j), $x_1$(i,j), and $x_1$'(i,j) correspond to those for obtaining $y_0$(i,j), $x_0$(i,j), and $x_0$'(i,j).

Figure 2:
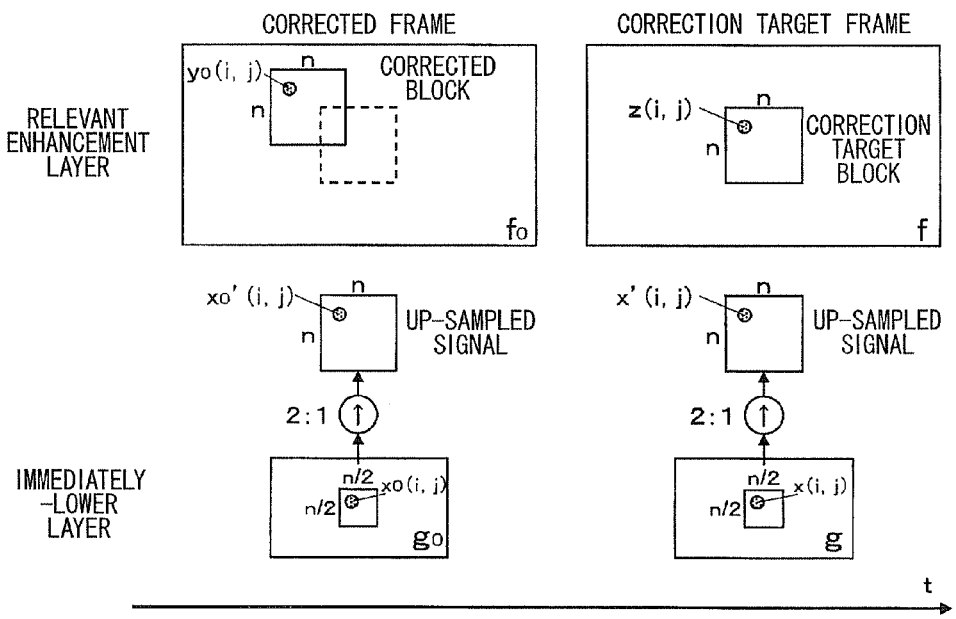
FIG. 2 is a diagram used for explaining a weighted motion prediction in accordance with the present invention.

The above definition will be shown in FIG. 2, where the resolution ratio between the relevant enhancement layer and the immediately-lower layer is 2:1 both in the vertical and horizontal directions. Similar operations can be performed for other resolution ratios than 2:1.

In addition, a DC (direct current) component of the corrected block in frame $f_0$ is represented by $Y_0$, and a DC component of a block in frame g, which has the same spatial position as the correction target block in frame f, is represented by X. For FIG. 2, these components are computed as follows.

[Formula 1]

$$Y_0 = \frac{1}{n^2} \sum_{i=0}^{n-1} \sum_{j=0}^{n-1} y_0(i, j) \quad (1)$$

$$X = \frac{1}{\left(\frac{n}{2}\right)^2} \sum_{i=0}^{\frac{n}{2}-1} \sum_{j=0}^{\frac{n}{2}-1} x(i, j) \quad (2)$$

The methods for providing $X_0$, $X_0$', $X_1$, $X_0$', and $Y_1$ correspond to those for providing X and $Y_0$.

Method of Computing Weighting Coefficients for P Slice and L0/L1 Prediction of B Slice In a prediction applied to a single slice (e.g., prediction for P slice or L0/L1 prediction of B slice), the predicted signal value z(i,j) is computed as follows.

For P slice or L0 prediction of B slice:

$$z(i,j) = w_0 y_0(i,j) + d_0$$

For L1 prediction of B slice:

$$z(i,j) = w_1 y_1(i,j) + d_1 \quad (3)$$

Below, three computation methods for weighting coefficients $w_0$ and $d_0$, or $w_1$ and $d_1$ will be shown The following explanation relates to prediction for P slice or L0 prediction of B slice. For L1 prediction of B slice, elements relating to frames $f_0$ and $g_0$ are converted to those for frames $f_1$ and $g_1$.

The three computation methods are based on the following assumption. As frames f and g are information obtained at the same time, it is predicted that both have similar signal brightness values. Therefore, brightness information of the known frame g is used for indirectly predicting a brightness variation from the corrected frame $f_0$ to the correction target frame f.

Method 1-1: Proportional Coefficient Correction Using DC Component in Single Frame Prediction In this method, the weighting coefficients are computed as follows.

$$w_0 = X/Y_0 \quad (4)$$

$$d_0 = 0 \quad (5)$$

In Formula (4), X may be replaced with DC component X' of the relevant up-sampled signal. In addition, the above X or X' may be replaced with a component corrected using a DC component relationship between the corrected frame $f_0$ and frame $g_0$ of the immediately-lower layer thereof.

Examples of such correction are a component obtained by multiplying X or X' by a DC component ratio $Y_0/X_0$ for the corrected frame $f_0$, and a component obtained by adding X or X' and a DC component difference $Y_0 - X_0$ for the corrected frame $f_0$.

Method 1-2: Offset Coefficient Correction Using DC Component in Single Frame Prediction In this method, the weighting coefficients are computed as follows.

$$w_0 = 1 \quad (6)$$

$$d_0 = X - Y_0 \quad (7)$$

Similar to the method 1-1, X in Formula (7) may be replaced with DC component X' of the up-sampled signal. In addition, the above X or X' may be replaced with a component corrected using a DC component relationship between the corrected frame $f_0$ and frame $g_0$ of the immediately-lower layer thereof. Examples of such correction are similar to those for the method 1-1.

Method 1-3: Weighting Coefficient Correction Using the Method of Least Squares in Single Frame Prediction In this method, the weighting coefficients are computed as follows, where $w_0$ and $d_0$ to which tildes are applied are variables used for obtaining $w_0$ and $d_0$.

[Formula 2]

$$\varepsilon = \sum_{i=0}^{n-1} \sum_{j=0}^{n-1} (\tilde{w}_0 \cdot y_0(i, j) + \tilde{d}_0 - x'(i, j))^2 \quad (8)$$

$$(w_0, d_0) = \arg\min_{\tilde{w}_0, \tilde{d}_0} \varepsilon \quad (9)$$

In Formula (8), x'(i,j) may be replaced with a component corrected using a decoded signal relationship between the corrected frame $f_0$ and frame $g_0$ of the immediately-lower layer thereof.

Examples of such correction are a component obtained by multiplying x'(i,j) by a decoded signal ratio "$y_0(i,j)/x_0'(i,j)$" for the corrected frame $f_0$, and a component obtained by adding x'(i,j) and a decoded signal difference "$y_0(i,j) - x_0'(i,j)$" for the corrected frame $f_0$.

The weighting coefficients ($w_0$, $d_0$) for providing the minimum value of $\epsilon$ can be acquired as solutions of the following simultaneous linear equations.

[Formula 3]

$$\frac{\partial \varepsilon}{\partial w_0} = 2\sum_{i=0}^{n-1}\sum_{j=0}^{n-1} y_0(i, j)(\overline{w}_0 \cdot y_0(i, j) + \overline{d}_0 - x'(i, j)) = 0 \quad (10)$$

$$\frac{\partial \varepsilon}{\partial d_0} = 2\sum_{i=0}^{n-1}\sum_{j=0}^{n-1} (\overline{w}_0 \cdot y_0(i, j) + \overline{d}_0 - x'(i, j)) = 0 \quad (11)$$

Method of Computing Weighting Coefficients for Bi-Predictive Prediction of B Slice In the bi-predictive prediction of B slices, the predicted signal value $z(i,j)$ is computed by follows.

$$z(i,j) = w_0 \cdot y_0(i,j) + w_1 \cdot y_1(i,j) + d \quad (12)$$

Below, two computation methods for weighting coefficients $w_0$, $w_1$ and $d$ will be shown.

The three computation methods are based on the following assumption. As frames f and g are information obtained at the same time, it is predicted that both have close signal brightness values. Therefore, brightness information of the known frame g is used for indirectly predicting a brightness variation from the corrected frames $f_0$ and $f_1$ to the correction target frame f.

Method 2-1: Weighting Coefficient Correction Using DC Component Block in Bi-Predictive Prediction In this method, the weighting coefficients are computed as follows.

$$w_0 = 1 - w_1 \quad (13)$$

$$w_1 = t_b/t_d \quad (14)$$

$$d_0 = X - w_0 \cdot Y_0 - w_1 \cdot Y_1 \quad (15)$$

In the above formulas, $t_b$ indicates an inter-frame distance from the corrected frame $f_0$ to the correction target frame f, and $t_d$ indicates an interframe distance from the corrected frame $f_0$ to the corrected frame $f_1$.

In Formula (15), X may be replaced with DC component X' of the up-sampled signal. In addition, the above X or X' may be replaced with a component corrected using DC components of the corrected frame $f_0$ and frame $g_0$ of the immediately-lower layer thereof, or DC components of the corrected frame $f_1$ and frame $g_1$ of the immediately-lower layer thereof. The correction method is similar to those shown for the above method 1-1.

Method 2-2: Weighting Coefficient Correction Using Method of Least Squares in Bi-Predictive Prediction In this method, the weighting coefficients are computed as follows.

[Formula 4]

$$\varepsilon = \sum_{i=0}^{n-1}\sum_{j=0}^{n-1} (w_0 \cdot y_0(i, j) + w_1 \cdot y_1(i, j) + \overline{d} - x'(i, j))^2 \quad (16)$$

$$(w_0, w_1, d) = \arg\min_{w_0, w_1, d} \varepsilon \quad (17)$$

In Formula (16), $x'(i,j)$ may be replaced with a component corrected using decoded signals of the corrected frame $f_0$ and frame $g_0$ of the immediately-lower layer thereof, or decoded signals of the corrected frame $f_1$ and frame $g_1$ of the immediately-lower layer thereof.

Examples of such correction are a component obtained by multiplying $x'(i,j)$ by a decoded signal ratio "$y_0(i,j)/x_0'(i,j)$" for the corrected frame $f_0$, and a component obtained by adding $x'(i,j)$ and a decoded signal difference "$y_0(i,j) - x_0'(i,j)$" for the corrected frame $f_0$. The correction method is similar to those shown for the above method 1-3.

The weighting coefficients ($w_0$, $w_1$, $d$) for providing the minimum value of $\epsilon$ can be acquired as solutions to the following simultaneous linear equations.

[Formula 5]

$$\frac{\partial \varepsilon}{\partial \tilde{w}_0} = 2\sum_{i=0}^{n-1}\sum_{j=0}^{n-1} y_0(i, j)(\tilde{w}_0 \cdot y_0(i, j) + \tilde{w}_1 \cdot y_1(i, j) + \tilde{d} - x'(i, j)) = 0 \quad (18)$$

$$\frac{\partial \varepsilon}{\partial \tilde{w}_1} = 2\sum_{i=0}^{n-1}\sum_{j=0}^{n-1} y_0(i, j)(\tilde{w}_0 \cdot y_0(i, j) + \tilde{w}_1 \cdot y_1(i, j) + \tilde{d} - x'(i, j)) = 0 \quad (19)$$

$$\frac{\partial \varepsilon}{\partial \tilde{d}} = 2\sum_{i=0}^{n-1}\sum_{j=0}^{n-1} (\tilde{w}_0 \cdot y_0(i, j) + \tilde{w}_1 \cdot y_1(i, j) + \tilde{d} - x'(i, j)) = 0 \quad (20)$$

In the conventional weighted motion prediction of H.264/AVC, the weighting coefficient switching is performed for each slice. In contrast, in the present invention, the weighting coefficient can be computed for any rectangular unit area, thereby improving the accuracy of the weighted motion prediction.

Additionally, in the conventional technique, transmission of weighting coefficient information is necessary for blocks to which uni-directional prediction is applied. In contrast, in the present invention, even for the blocks to which uni-directional prediction is applied, transmission of weighting coefficient information is unnecessary, and accurate weighted prediction can be performed.

In the conventional technique, in order to perform accurate weighted prediction when the brightness of the target video image varies non-linearly, it is necessary to transmit weighting coefficient information even for the bi-predictive prediction. In contrast, in the present invention, regardless of the manner of the temporal brightness variation of the target video image, it is unnecessary to transmit weighting coefficient information, and accurate weighted prediction can be performed.

In particular, when the signal value ratio between a decoded signal of a prediction reference block and the original signal of the current block is constant within the block, accurate weighting coefficients can be computed by the above method 1-1, and thus this method is preferable.

In addition, when the signal value difference between a decoded signal of a prediction reference block and the original signal of the current block is constant within the block, further accurate weighting coefficients can be computed by the above method 1-2, and thus this method is preferable.

When all spatial frequency components included in the original signal of the current block are close to spatial frequency components included in an interpolated signal of a spatially corresponding block of the immediately-lower layer, accurate weighting coefficients can be computed by the above methods 1-1, 1-2, and 2-1.

The above methods 1-3 and 2-2 can provide accurate weighting coefficients when only DC components included in the original signal of the current block are close to DC components included in an interpolated signal of a spatially corresponding block of the immediately-lower layer.

Operation Flow

Figure 3:
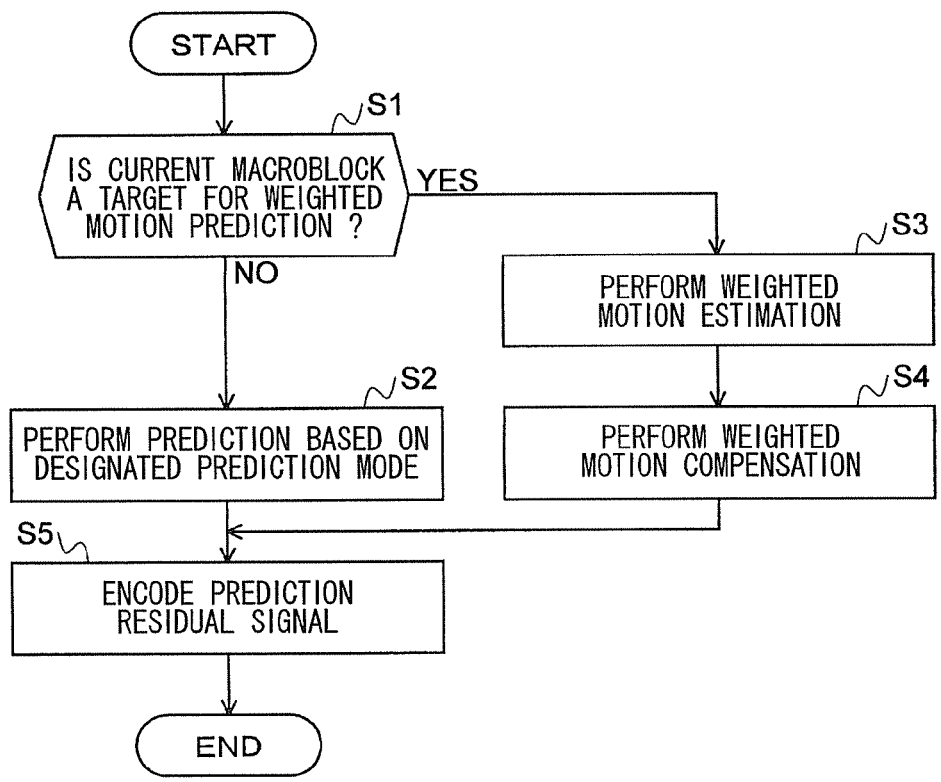
FIG. 3 is a diagram showing the flow of an encoding process in accordance with an embodiment of the present invention.

An embodiment of the encoding operation in accordance with the present invention will be explained with reference to FIG. 3. The explained embodiment is an encoding operation applied to a macroblock. Encoded data of a video image is produced by subjecting all macroblocks to the relevant operation.

Step S1: It is determined whether or not the current macroblock of the relevant enhancement layer is a target macroblock for the weighted motion prediction. If the result of the determination is YES, the process of step S3 is executed, and if the result of the determination is NO, the process of step S2 is executed.

The above determination may be performed based on predetermined conditions, which are not limited in the present embodiment.

Step S2: A predicted signal is generated in accordance with prediction mode information of the current macroblock, which is output by step S1. The prediction method in step S2 may be intraframe prediction, ordinary motion prediction (i.e., non-weighted), or interlayer prediction. The prediction method in JSVM shown in Non-Patent Document 3 is an example prediction method.

Step S3: When the current macroblock is a target for the weighted motion prediction, the original signal of the current macroblock, a macroblock decoded signal of the immediately-lower layer thereof, and a decoded signal of a search target macroblock (in a reference frame) are retrieved, so that weighted motion estimation is performed and motion vector information is output. This process is shown in detail in FIG. 5 (explained later).

Step S4: The motion vector information output in step S3 and the macroblock decoded signal of the immediately-lower layer thereof are obtained, so that weighted motion compensation is performed and a weighted-motion-predicted signal is output. This process is shown in detail in FIG. 6 (explained later).

Step S5: The predicted signal output by step S2 or S4 is obtained, and a differential signal between the predicted signal and the original signal of the current macroblock is generated. The differential signal is then encoded. The encoding method in JSVM shown in Non-Patent Document 3 is an example encoding method.

Figure 4:
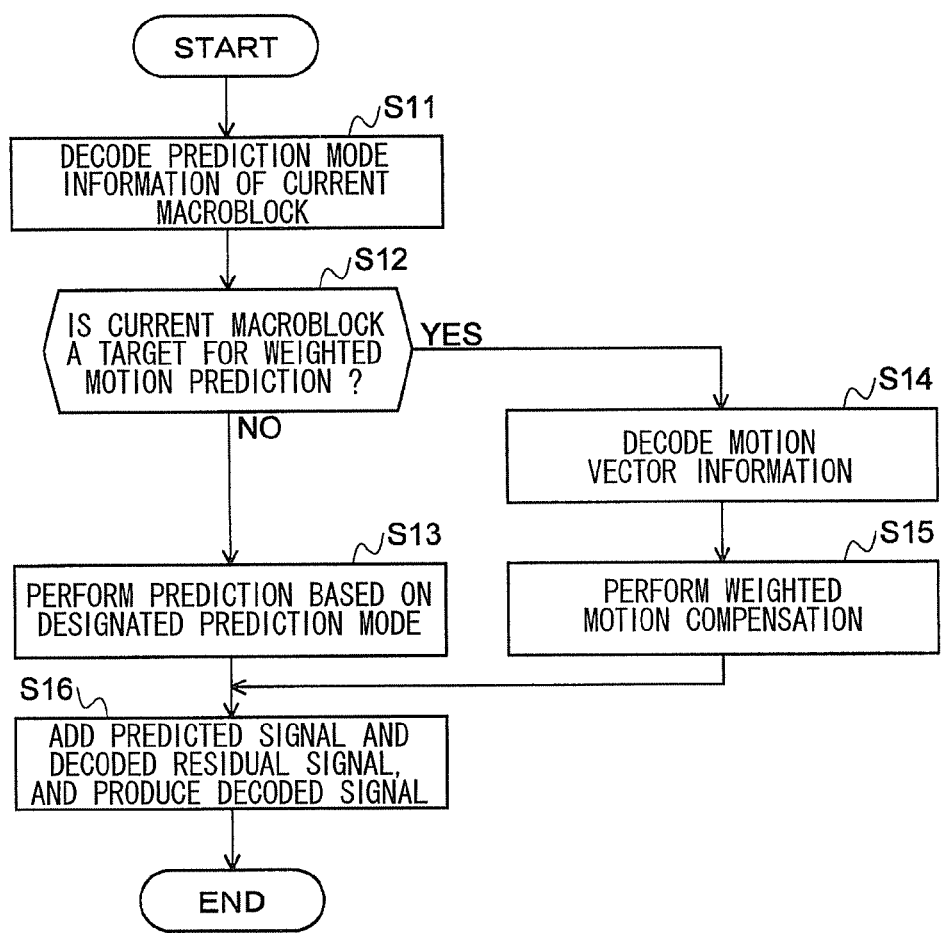
FIG. 4 is a diagram showing the flow of a decoding process in accordance with an embodiment of the present invention.

An embodiment of the decoding operation in accordance with the present invention will be explained with reference to FIG. 4. The explained embodiment is a decoding operation applied to a macroblock. A decoded signal of a video image is produced by subjecting all macroblocks to the relevant operation.

Step S11: Encoded data for the prediction mode of the current macroblock of the relevant enhancement layer is retrieved and subjected to a decoding process, thereby outputting prediction mode information.

Step S12: It is determined whether or not the current macroblock of the relevant enhancement layer is a target macroblock for the weighted motion prediction. If the result of the determination is YES, the process of step S14 is executed, and if the result of the determination is NO, the process of step S13 is executed.

Step S13: A predicted signal is generated in accordance with prediction mode information of the current macroblock, which is output by step S11. The prediction method in step S13 may be intraframe prediction, ordinary motion prediction (i.e., non-weighted), or interlayer prediction. The prediction method in JSVM shown in Non-Patent Document 3 is an example prediction method.

Step S14: When the current macroblock is a target macroblock for the weighted motion prediction, encoded data for the motion vector of the current macroblock is retrieved and is subjected to a decoding process, thereby outputting motion vector information.

Step S15: The motion vector information output in step S14 and the macroblock decoded signal of the immediately-lower layer thereof are obtained, so that weighted motion compensation is performed and a weighted-motion-predicted signal is output. This process is also shown in detail in FIG. 6 (explained later).

Step S16: The predicted signal output by step S13 or S15 is obtained and is added to a decoded prediction residual signal, thereby producing and outputting a decoded signal.

An embodiment of the weighted motion estimation (step S3) in accordance with the present invention will be explained with reference to FIG. 5.

Step S21: A decoded signal of a macroblock of the immediately-lower layer and a decoded signal of the current search target macroblock (in the reference frame) are retrieved, and weighting coefficients defined between both macroblocks are computed and output. This process is shown in detail in FIG. 7 (explained later).

Step S22: The weighting coefficient information output by step S21 is obtained, and the decoded signal of the current search target macroblock is corrected by the relevant weighting coefficients. The corrected signal value is output.

Step S23: An encoding cost determined between the signal value output by step S22 and the original signal of the current macroblock is computed by the relevant amount of code and the amount of encoding distortion, and the computed cost is output.

Step S24: It is determined whether or not all search target macroblocks have been subjected to the relevant search. If the result of the determination is YES, the process of step S26 is executed, and if the result of the determination is NO, the process of step S25 is executed.

Step S25: The next target macroblock is set to be a processing target, so as to repeat the operation from step S21.

Step S26: The encoding cost information output by step S23 is obtained, and a macroblock having the minimum encoding cost is selected from among the macroblocks which were searched for. A coordinate position difference between the selected macroblock and the current macroblock is output as a motion vector.

Figure 6:
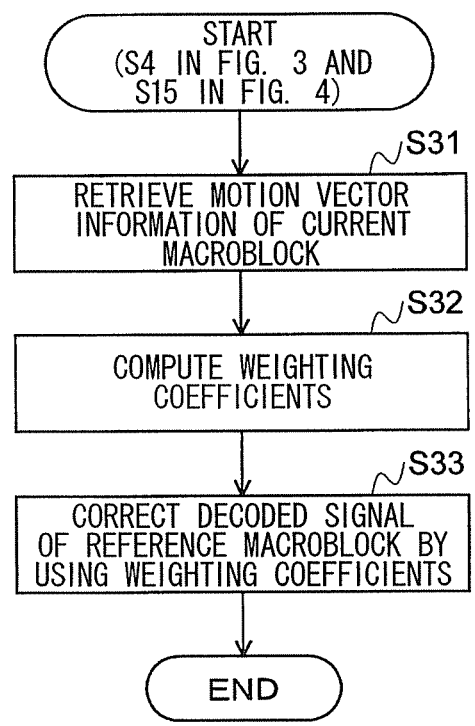
FIG. 6 is a diagram showing the flow of a weighted motion compensation in the encoding and decoding operations.

An embodiment of the weighted motion compensation (step S4 and step S15) in accordance with the present invention will be explained with reference to FIG. 6.

Step S31: Motion vector information of the current macroblock is retrieved and output. The motion vector information is retrieved from (i) a signal output from a weighted motion estimator in the weighted motion compensation in an encoding process, or (ii) a signal output from a motion vector decoding processor in the weighted motion compensation in a decoding process.

Step S32: A decoded signal of a macroblock in the immediately-lower layer and the motion vector information output in step S31 are obtained, and weighting coefficients defined between a reference macroblock indicated by the relevant motion vector and the current macroblock are computed and output. This process is shown in detail in FIG. 7 (explained later).

Figure 5:
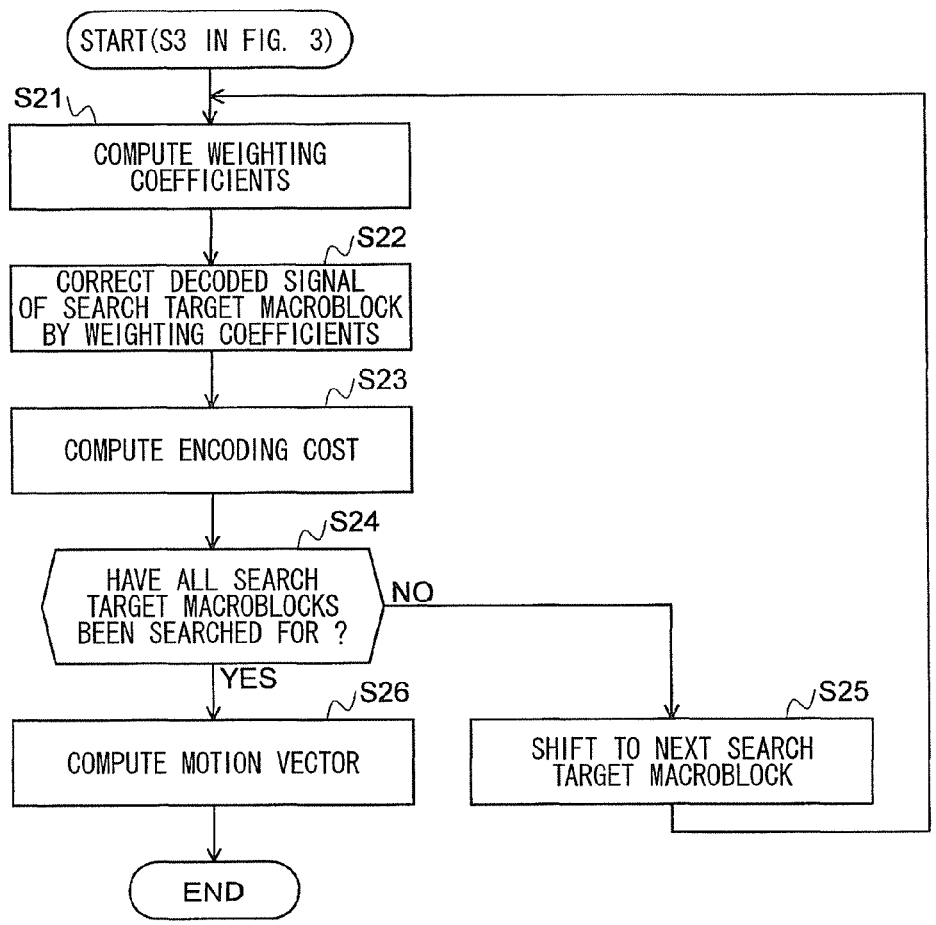
FIG. 5 is a diagram showing the flow of a weighted motion estimation in the encoding operation.

In the encoding process, the weighting coefficients computed in the weighted estimation process shown in FIG. 5 may be stored together with the motion vector information and output.

Step S33: The weighting coefficient information output in step S32 is obtained, and the decoded signal of the reference macroblock is corrected by the relevant weighting coefficients. The corrected signal value is then output.

Figure 7:
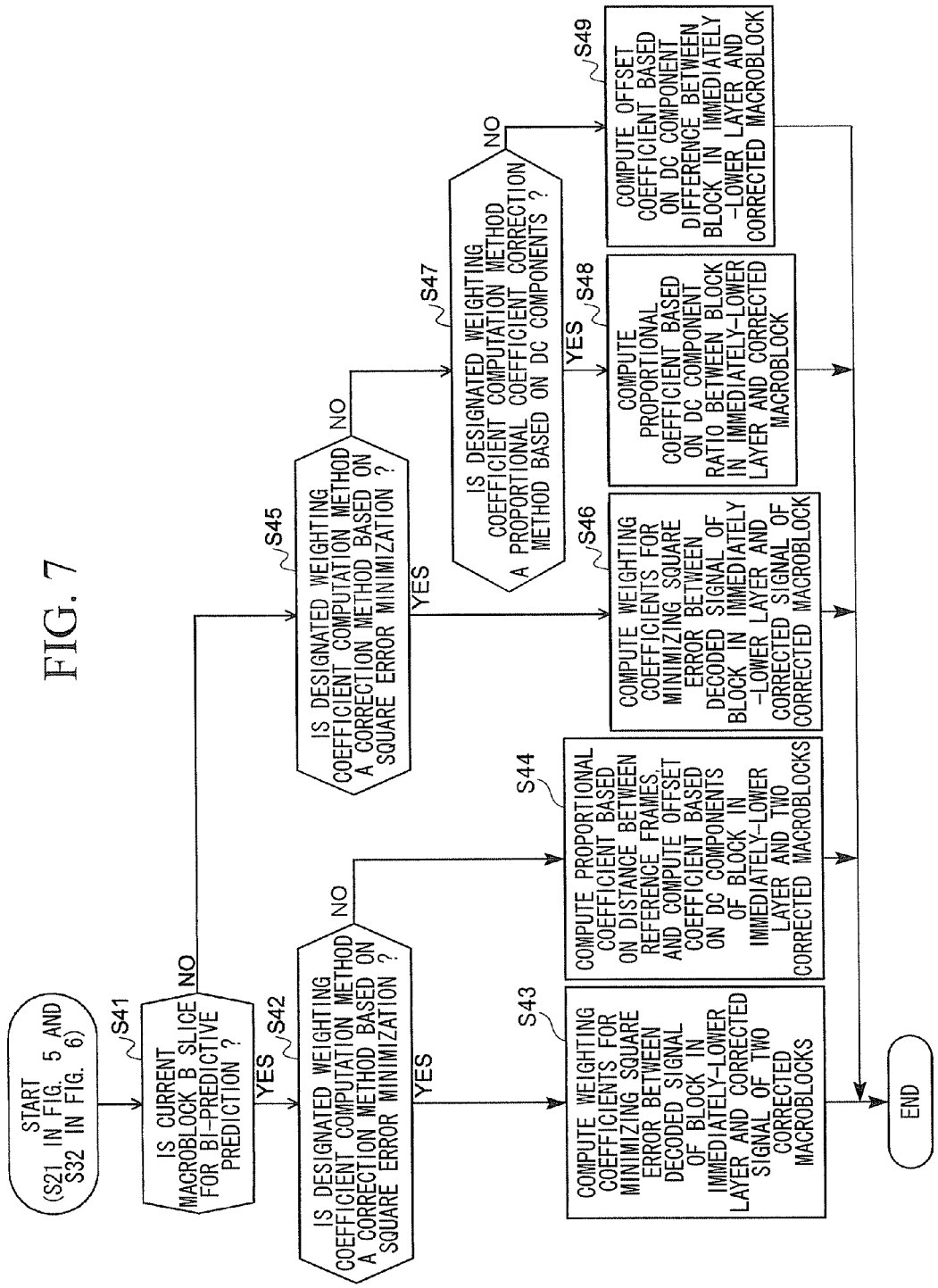
FIG. 7 is a diagram showing the flow of a weighting coefficient computation in the encoding and decoding operations.

An embodiment of the weighting coefficient computation (step S21 and step S32) in accordance with the present invention will be explained with reference to FIG. 7.

Step S41: It is determined whether or not it has been determined that the slice to which the current macroblock belongs is a B slice and the bi-predictive prediction is performed. If the result of the determination is YES, the process of step S42 is executed, and if the result of the determination is NO, the process of step S45 is executed.

Step S42: It is determined whether or not a weighting coefficient computation method (for the current macroblock) designated by an external device is a weighting coefficient correction method based on a square error minimization for the B slice bi-predictive prediction. If the result of the determination is YES, the process of step S43 is executed, and if the result of the determination is NO, the process of step S44 is executed.

Examples of how to provide the designation information of the weighting coefficient computation method from an external device are (i) to initially define the method as a setting condition of the encoding process and store it in a picture parameter set, and (ii) to select an appropriate method for each slice by means of multi-pass processing.

Step S43: Weighting coefficients for minimizing the square error between a corrected signal formed by decoded signals of the two corrected macroblocks and the decoded signal of the relevant macroblock in the immediately-lower layer are computed and output. This process is shown in detail in FIG. 8 (explained later).

Step S44: A proportional coefficient is computed based on the inter-frame distance between the two corrected frames and the current frame, and an offset coefficient is computed based on DC components of the decoded signals of the two corrected macroblocks and the decoded signal of the macroblock in the immediately-lower layer. The computed coefficients are output. This process is shown in detail in FIG. 9 (explained later).

Step S45: It is determined whether or not a weighting coefficient computation method (for the current macroblock) designated by an external device is a weighting coefficient correction method based on a square error minimization for P slices or the B slice L0/L1 prediction. If the result of the determination is YES, the process of step S46 is executed, and if the result of the determination is NO, the process of step S47 is executed.

Similar to step S42, examples of how to provide the designation information of the weighting coefficient computation method from an external device are (i) to initially define the method as a setting condition of the encoding process and store it in a picture parameter set, and (ii) to select an appropriate method for each slice by means of multi-pass processing.

Step S46: Weighting coefficients for minimizing the square error between a corrected signal formed by a decoded signal of the corrected macroblock and the decoded signal of the relevant macroblock in the immediately-lower layer are computed and output. This process is shown in detail in FIG. 10 (explained later).

Step S47: It is determined whether or not a weighting coefficient computation method (for the current macroblock) designated by an external device is a proportional coefficient correction method based on DC components for P slices or the B slice L0/L1 prediction. If the result of the determination is YES, the process of step S48 is executed, and if the result of the determination is NO, the process of step S49 is executed.

Similar to steps S42 and S45, examples of how to provide the designation information of the weighting coefficient computation method from an external device are (i) to initially define the method as a setting condition of the encoding process and store it in a picture parameter set, and (ii) to select an appropriate method for each slice by means of multi-pass processing.

Step S48: A DC component ratio between the decoded signal of the corrected macroblock and the decoded signal of the macroblock in the immediately-lower layer, and is output as a proportional coefficient. This process is shown in detail in FIG. 11 (explained later).

Step S49: A DC component difference between the decoded signal of the corrected macroblock and the decoded signal of the macroblock in the immediately-lower layer, and is output as an offset coefficient. This process is shown in detail in FIG. 12 (explained later).

Figure 8:
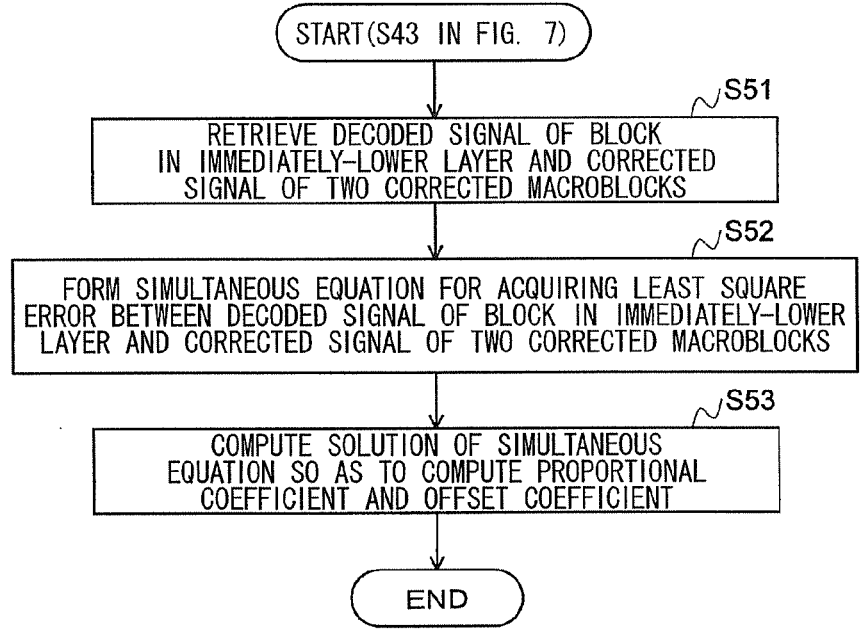
FIG. 8 is a diagram showing the detailed flow of step S43 in FIG. 7.

An embodiment of the process of step S43 in FIG. 7 will be explained with reference to FIG. 8.

Step S51: The decoded signal of the macroblock in the immediately-lower layer and the decoded signals of the two corrected macroblocks are retrieved, and stored in a buffer.

Step S52: The decoded signal of the macroblock in the immediately-lower layer and the decoded signals of the two corrected macroblocks are obtained from the buffer, and a simultaneous equation for acquiring the least square error between a corrected signal formed by the decoded signals of the two corrected macroblocks and the decoded signal of the macroblock in the immediately-lower layer is generated. The generated simultaneous equation is stored in a register.

Step S53: The simultaneous equation generated in step S52 is retrieved from the register, and the solution thereof is computed so that a proportional coefficient and an offset coefficient are computed and output. The solution may be obtained using a Gauss elimination method. The above process is performed using the above-described formulas (16) and (17).

Figure 9:
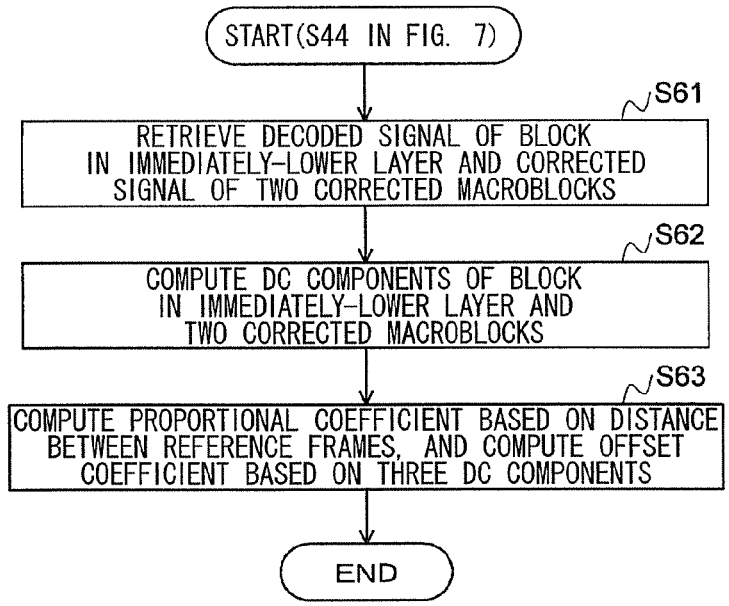
FIG. 9 is a diagram showing the detailed flow of step S44 in FIG. 7.

An embodiment of the process of step S44 in FIG. 7 will be explained with reference to FIG. 9.

Step S61: The decoded signal of the macroblock in the immediately-lower layer and the decoded signals of the two corrected macroblocks are retrieved, and stored in a buffer.

Step S62: The decoded signal of the macroblock in the immediately-lower layer and the decoded signals of the two corrected macroblocks are obtained from the buffer, and DC components of the decoded signal of the macroblock in the immediately-lower layer and the decoded signals of the two corrected macroblocks are computed. The computed DC components are stored in a register.

Step S63: The DC components computed in step S62 are retrieved from the register. A proportional coefficient is computed based on a distance between the reference frames, and an offset coefficient is computed in accordance with the above-described formulas (13) to (15). The computed coefficients are output.

Figure 10:
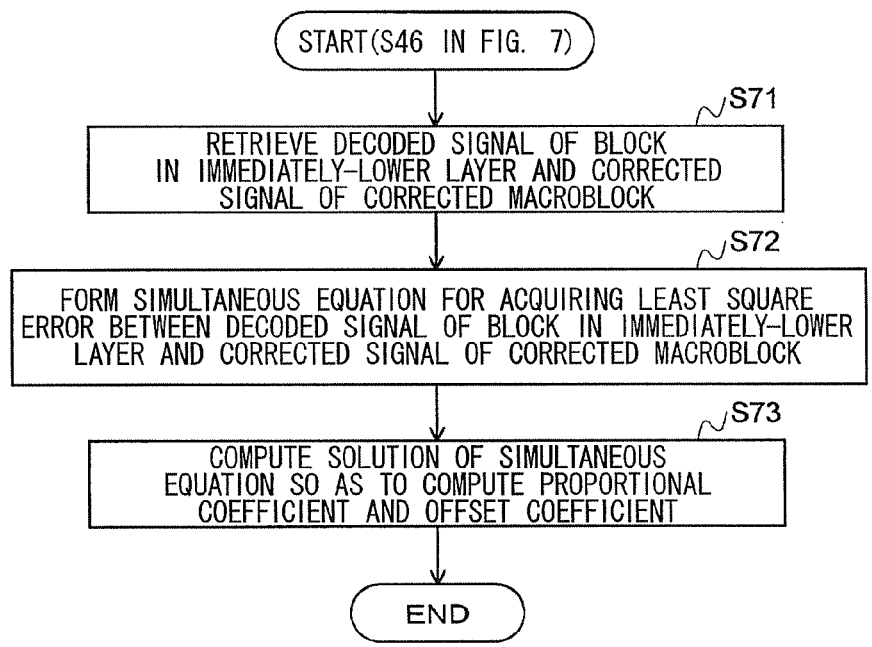
FIG. 10 is a diagram showing the detailed flow of step S46 in FIG. 7.

An embodiment of the process of step S46 in FIG. 7 will be explained with reference to FIG. 10.

Step S71: The decoded signal of the macroblock in the immediately-lower layer and the decoded signal of the corrected macroblock are retrieved, and stored in a buffer.

Step S72: The decoded signal of the macroblock in the immediately-lower layer and the decoded signal of the corrected macroblock are obtained from the buffer, and a simultaneous equation for acquiring the least square error between a corrected signal formed by the decoded signal of the corrected macroblock and the decoded signal of the macroblock in the immediately-lower layer is generated. The generated simultaneous equation is stored in a register.

Step S73: The simultaneous equation generated in step S72 is retrieved from the register, and the solution thereof is computed so that a proportional coefficient and an offset coefficient are computed and output. The solution may be obtained using a Gauss elimination method. The above process is performed using the above-described formulas (8) and (9).

Figure 11:
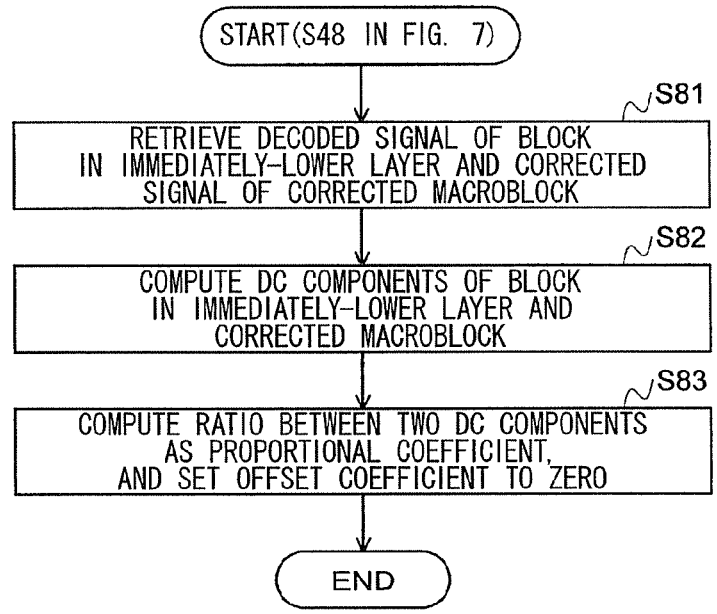
FIG. 11 is a diagram showing the detailed flow of step S48 in FIG. 7.

An embodiment of the process of step S48 in FIG. 7 will be explained with reference to FIG. 11.

Step S81: The decoded signal of the macroblock in the immediately-lower layer and the decoded signal of the corrected macroblock are retrieved, and stored in a buffer.

Step S82: The decoded signal of the macroblock in the immediately-lower layer and the decoded signal of the corrected macroblock are obtained from the buffer, and DC components of the decoded signal of the macroblock in the immediately-lower layer and the decoded signal of the corrected macroblock are computed. The computed DC components are stored in a register.

Step S83: The DC components computed in step S82 are retrieved from the register. A ratio between both DC components is computed as a proportional coefficient, and the offset coefficient is set to zero. The computed coefficients are output. This process is performed using the above-described formulas (4) and (5).

Figure 12:
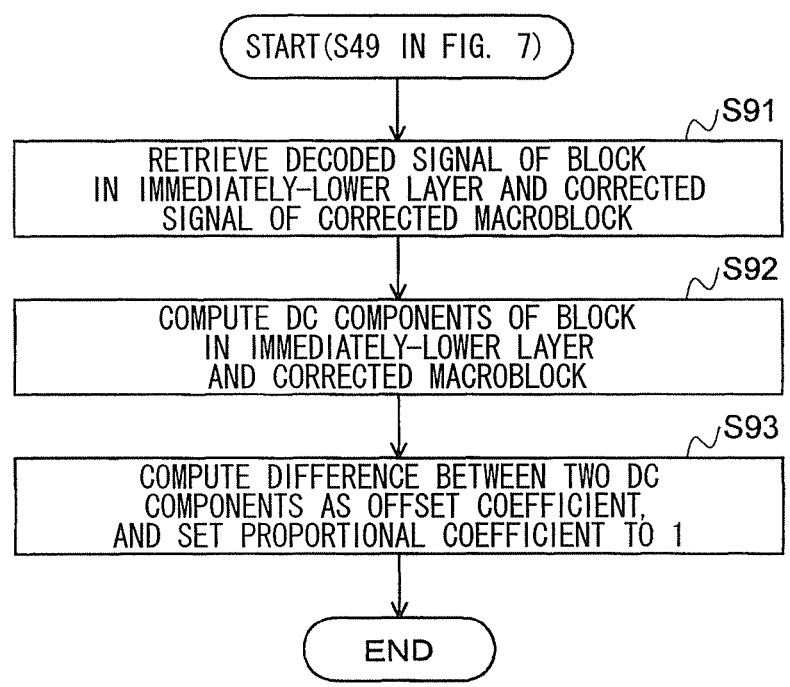
FIG. 12 is a diagram showing the detailed flow of step S49 in FIG. 7.

An embodiment of the process of step S49 in FIG. 7 will be explained with reference to FIG. 12.

Step S91: The decoded signal of the macroblock in the immediately-lower layer and the decoded signal of the corrected macroblock are retrieved, and stored in a buffer.

Step S92: The decoded signal of the macroblock in the immediately-lower layer and the decoded signal of the corrected macroblock are obtained from the buffer, and DC components of the decoded signal of the macroblock in the immediately-lower layer and the decoded signal of the corrected macroblock are computed. The computed DC components are stored in a register.

Step S93: The DC components computed in step S92 are retrieved from the register. A difference between both DC components is computed as an offset coefficient, and the proportional coefficient is set to 1. The computed coefficients are output. This process is performed using the above-described formulas (6) and (7).

Processing Apparatuses

Figure 13:
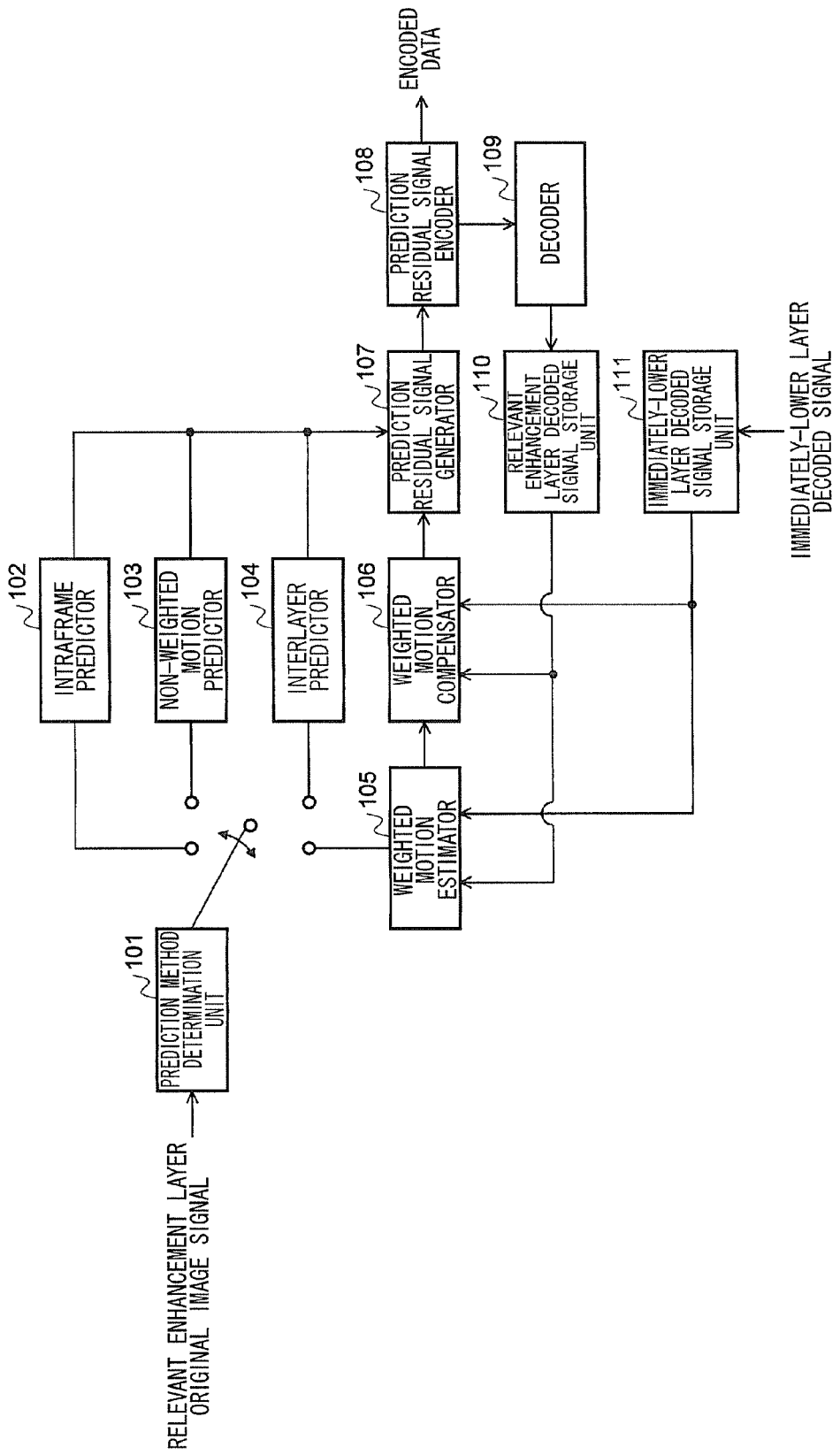
FIG. 13 is a diagram showing an example of the structure of an encoding apparatus as an embodiment of the present invention.

A structure example of an encoding apparatus in accordance with the present invention is shown in FIG. 13, which processes a single macroblock.

Prediction method determination unit 101: It retrieves designation information of the prediction method for the current macroblock. In accordance with the designation information, the current processing device is switched to an intraframe predictor 102 for intraframe prediction, a non-weighted motion predictor 103 for ordinary non-weighted motion prediction, an interlayer predictor 104 for interlayer prediction, or a weighted motion estimator 105 for weighted motion prediction.

Intraframe predictor 102: It retrieves the original signal and a decoded signal of an encoding target frame, and performs intraframe prediction so as to generate a predicted signal. The intraframe predictor 102 outputs the predicted signal to a prediction residual signal generator 107. The intraframe prediction in JSVM shown in Non-Patent Document 3 is an example intraframe prediction method.

Non-weighted motion predictor 103: It retrieves the original signal of the encoding target frame and a decoded signal of a reference frame, and performs ordinary non-weighted motion prediction so as to generate a predicted signal, which is output to the prediction residual signal generator 107. The non-weighted motion prediction in JSVM in Non-Patent Document 3 is an example of a non-weighted motion prediction method.

Interlayer predictor 104: It retrieves the original signal of the encoding target frame and a decoded signal of the immediately-lower layer, and performs interlayer prediction so as to generate a predicted signal, which is output to the prediction residual signal generator 107. The interlayer prediction in JSVM in Non-Patent Document 3 is an example of an interlayer prediction method.

Figure 15:
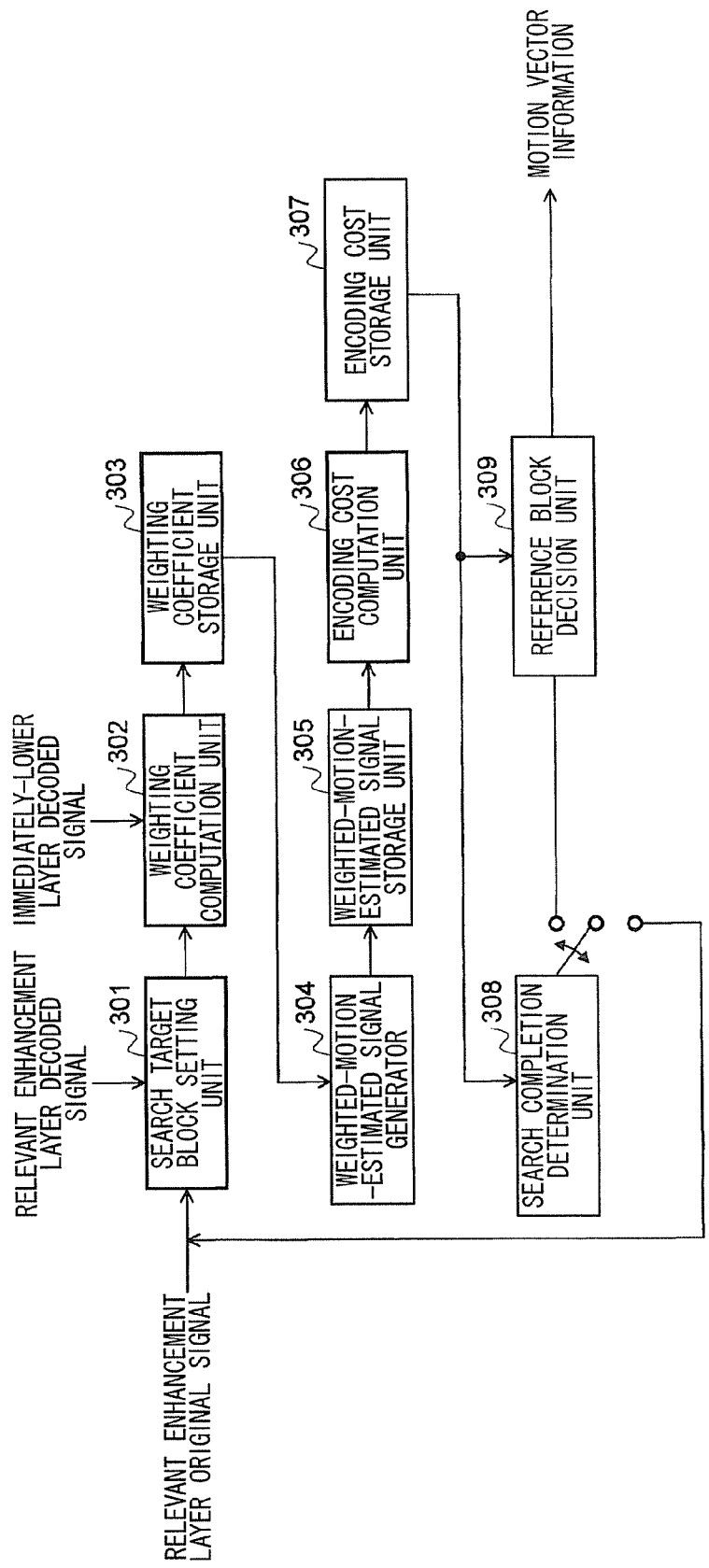
FIG. 15 is a diagram showing an example of the structure of a weighted motion estimator.

Weighted motion estimator 105: It retrieves the original signal of the encoding target frame, a decoded signal of a reference frame which is output from a relevant enhancement layer decoded signal storage unit 110, and a decoded signal of the immediately-lower layer which is output from an immediately-lower layer decoded signal storage unit 111, and performs weighted motion estimation so as to generate a motion vector, which is output to a weighted motion compensator 106. The detailed structure of the weighted motion estimator 105 is shown in FIG. 15 (explained later).

Figure 16:
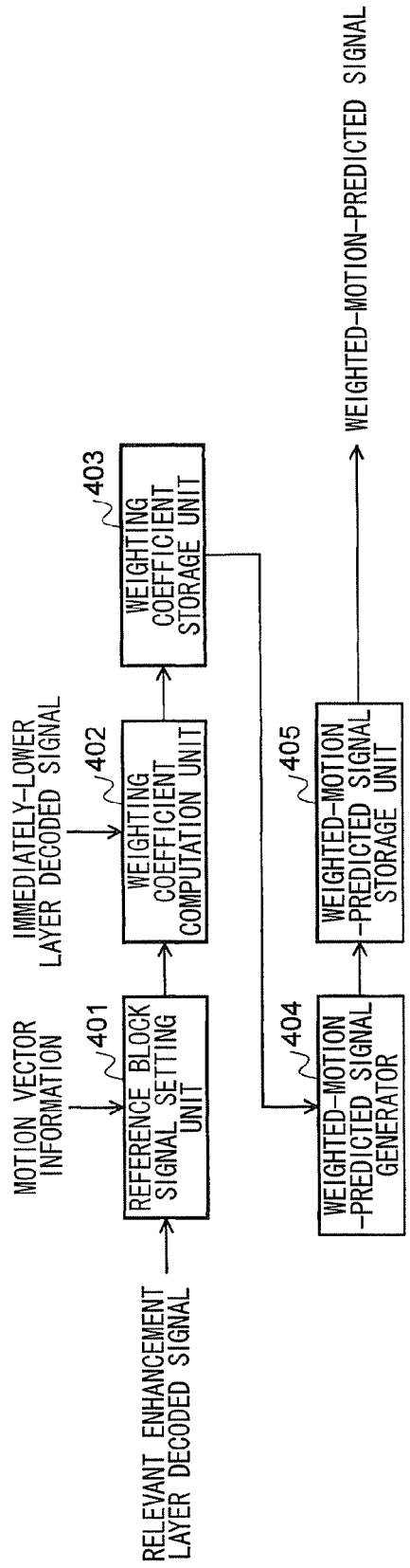
FIG. 16 is a diagram showing an example of the structure of a weighted motion compensator.

Weighted motion compensator 106: It retrieves the decoded signal of the reference frame output from the relevant enhancement layer decoded signal storage unit 110 and the decoded signal of the immediately-lower layer output from the immediately-lower layer decoded signal storage unit 111, and performs weighted motion compensation so as to generate a predicted signal, which is output to the prediction residual signal generator 107. The detailed structure of the weighted motion compensator 106 is shown in FIG. 16 (explained later).

Prediction residual signal generator 107: It receives the original signal of the encoding target frame and the predicted signal output from the intraframe predictor 102, the non-weighted motion predictor 103, the interlayer predictor 104, or the weighted motion compensator 106, and generates a differential signal therebetween, which is output to a prediction residual signal encoder 108.

Prediction residual signal encoder 108: It receives the prediction residual signal output from the prediction residual signal generator 107, and subjects it to encoding, thereby outputting encoded data. Simultaneously, the prediction residual signal encoder 108 inputs the encoded data into a buffer so as to input the encoded data into a decoder 109. A processing series of orthogonal transformation, quantization, and variable-length encoding in JSVM in Non-Patent Document 3 is an example process of encoding a prediction residual signal.

Decoder 109: It retrieves the encoded data from the above buffer, and subjects the encoded data to decoding. The obtained decoded signal is output to the relevant enhancement layer decoded signal storage unit 110. The decoding process is performed based on the decoding method of the present invention. The detailed structure of a decoding apparatus for performing the decoding is shown in FIG. 14 (explained later).

Immediately-lower layer decoded signal storage unit 111: It retrieves the decoded signal obtained by the decoding process applied to the encoded data of the immediately-lower layer, and outputs the obtained decoded signal into a buffer.

Figure 14:
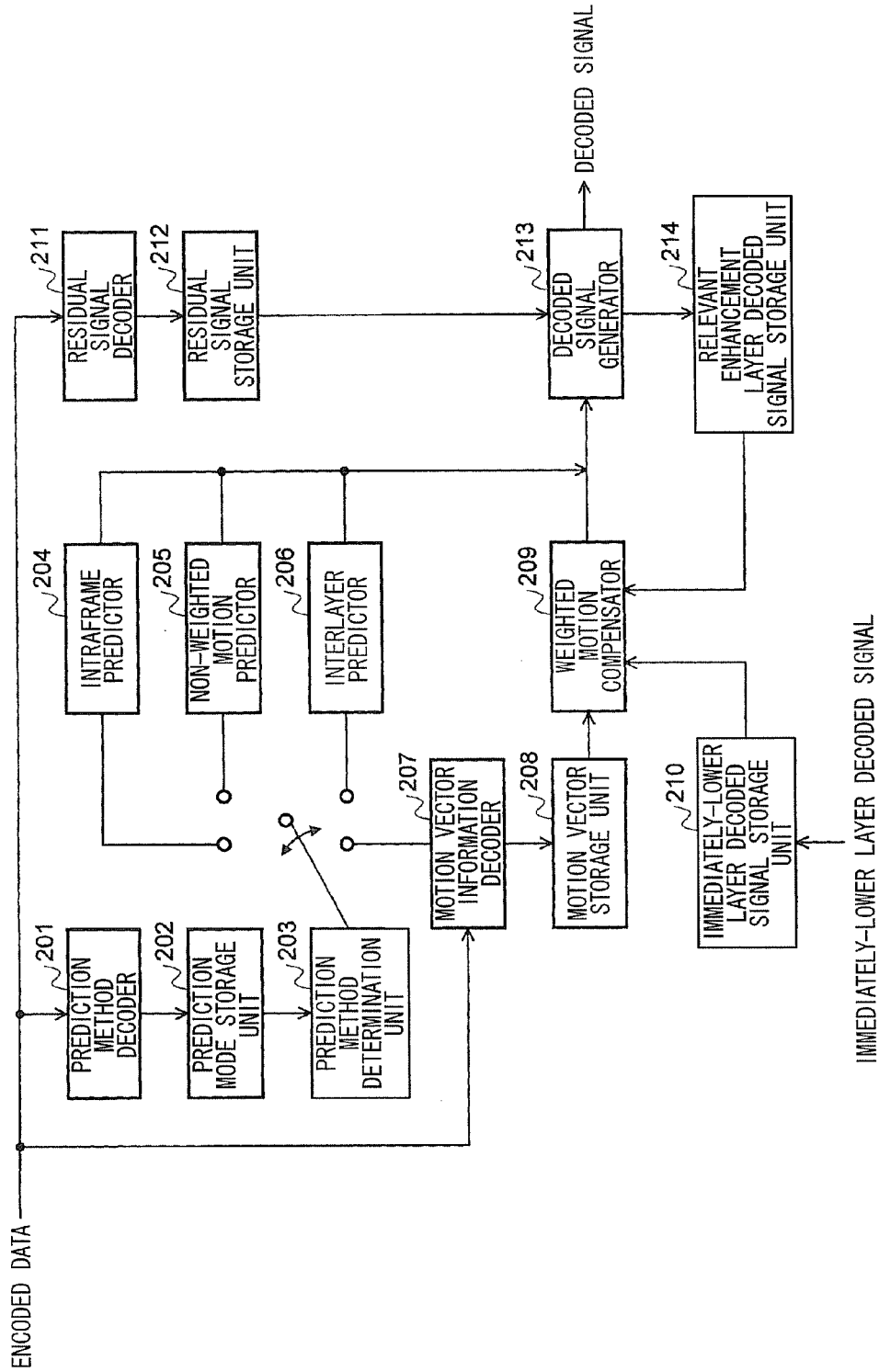
FIG. 14 is a diagram showing an example of the structure of a decoding apparatus as an embodiment of the present invention.

A structure example of a decoding apparatus in accordance with the present invention is shown in FIG. 14, which processes a single macroblock.

Prediction method decoder 201: It retrieves encoded data of the prediction mode of the relevant macroblock, and subjects the encoded data to a decoding process. The obtained prediction mode information is output to a prediction mode storage unit 202.

Prediction method determination unit 203: It retrieves the prediction mode information from the prediction mode storage unit 202. In accordance with the corresponding designation information, the prediction method determination unit 203 selects a connection device which is an intraframe predictor 204 for intraframe prediction, a non-weighted motion predictor 205 for ordinary non-weighted motion prediction, an interlayer predictor 206 for interlayer prediction, or a motion vector information decoder 207 for weighted motion prediction.

Intraframe predictor 204: It retrieves the original signal and a decoded signal of an encoding target frame, and performs intraframe prediction so as to generate a predicted signal. The intraframe predictor 204 outputs the predicted signal to a decoded signal generator 213.

Non-weighted motion predictor 205: It retrieves the original signal of the encoding target frame and a decoded signal of a reference frame, and performs ordinary non-weighted motion prediction so as to generate a predicted signal, which is output to the decoded signal generator 213.

Interlayer predictor 206: It retrieves the original signal of the encoding target frame and a decoded signal of the immediately-lower layer, and performs interlayer prediction so as to generate a predicted signal, which is output to the decoded signal generator 213.

Motion vector information decoder 207: It retrieves encoded data for a motion vector of the relevant macroblock, and subjects the encoded data to a decoding process. The obtained motion vector information is output to a motion vector storage unit 208.

Weighted motion compensator 209: It retrieves a decoded signal of a reference frame output from a relevant enhancement layer decoded signal storage unit 214 and a decoded signal of the immediately-lower layer output from an immediately-lower layer decoded signal storage unit 210, and performs weighted motion compensation so as to generate a predicted signal, which is output to the decoded signal generator 213. The detailed structure of the weighted motion compensator 209 is shown in FIG. 16 (explained later).

Immediately-lower layer decoded signal storage unit 210: It receives the decoded signal obtained by decoding encoded information of the immediately-lower layer, and stores the decoded signal in a buffer.

Residual signal decoder 211: It retrieves encoded data for a residual signal of the current macroblock, and decodes the encoded data. The obtained residual signal is output to a residual signal storage unit 212.

Decoded signal generator 213: It receives the predicted signal output from the intraframe predictor 204, the non-weighted motion predictor 205, the interlayer predictor 206, or the weighted motion compensator 209, and synthesizes the predicted signal and the residual signal retrieved from the residual signal storage unit 212, so as to generate a decoded signal and output it to an external device. The decoded signal generator 213 simultaneously stores the decoded signal in the relevant enhancement layer decoded signal storage unit 214.

An example structure of the weighted motion estimator 105 in FIG. 13 is shown in FIG. 15. That is, FIG. 15 is a diagram showing an apparatus which applies weighted motion estimation to a macroblock in the relevant enhancement layer.

Search target block setting unit 301: It retrieves the decoded signal of the reference frame, which is a decoded signal of the relevant enhancement layer, and determines a macroblock as the search target for motion estimation. The search target block setting unit 301 outputs a decoded signal of the relevant macroblock to a weighting coefficient computation unit 302.

Weighting coefficient computation unit 302: It receives the decoded signal of the search target macroblock output from the search target block setting unit 301 and the decoded signal of the relevant block in the immediately-lower layer, and computes weighting coefficients which indicate a brightness variation between both blocks, and are output to a weighting coefficient storage unit 303.

Weighted-motion-estimated signal generator 304: It retrieves the weighting coefficients from the weighting coefficient storage unit 303, and corrects the decoded signal of the search target block based on the weighting coefficients. The corrected signal is output to a weighted-motion-estimated signal storage unit 305.

Encoding cost computation unit 306: It retrieves the weighted-motion-estimated signal from the weighted-motion-estimated signal storage unit 305, and computes an encoding cost for the original signal of the current macroblock. The computed cost is output to an encoding cost storage unit 307.

Search completion determination unit 308: It determines whether or not the search of the reference frame in the weighted motion estimation for the current macroblock has been performed over all the designated search area. If the result of the determination is true, a reference block setting unit 309 is selected to be connected to the search completion determination unit 308, while if the result of the determination is false, the search target block setting unit 301 is selected.

Reference block decision unit 309: It retrieves a set of the encoding cost data for all search target macroblocks from the encoding cost storage unit 307, and decides one of the search target macroblocks which has the minimum encoding cost to be the reference block. The reference block decision unit 309 outputs a coordinate position difference between the reference block and the current macroblock.

An example structure of the weighted motion compensator 106 in FIG. 13 and the weighted motion compensator 209 in FIG. 14 is shown in FIG. 16. That is, FIG. 16 is a diagram showing an apparatus which applies weighted motion compensation to a macroblock in the relevant enhancement layer.

Reference block signal setting unit 401: It retrieves the decoded signal of the reference frame, which is a decoded signal of the relevant enhancement layer, and motion vector information, determines a reference macroblock, and outputs the signal of the macroblock to a weighting coefficient computation unit 402.

The above vector information is supplied from (i) the weighted motion estimator 105 (in FIG. 13) when the relevant weighted motion compensator is provided in the encoding apparatus, or (ii) the motion vector storage unit 208 (in FIG. 14) for storing the decoded motion vector information when the weighted motion compensator is provided in the decoding apparatus.

Weighting coefficient computation unit 402: It receives the decoded signal of the reference macroblock output from the reference block signal setting unit 401 and the decoded signal of the relevant block in the immediately-lower layer, and computes weighting coefficients which indicate a brightness variation between both blocks, and are output to a weighting coefficient storage unit 403. In the weighted motion compensation during in the encoding operation, the weighting coefficients computed in the weighted motion estimator 105 (in FIG. 13) may be stored together with the motion vector information, and output to the weighting coefficient storage unit 403.

Weighted-motion-predicted signal generator 404: It retrieves the weighting coefficients from the weighting coefficient storage unit 403, and corrects the decoded signal of the reference block based on the weighting coefficients. The corrected signal is output to a weighted-motion-predicted signal storage unit 405.

Figure 17:
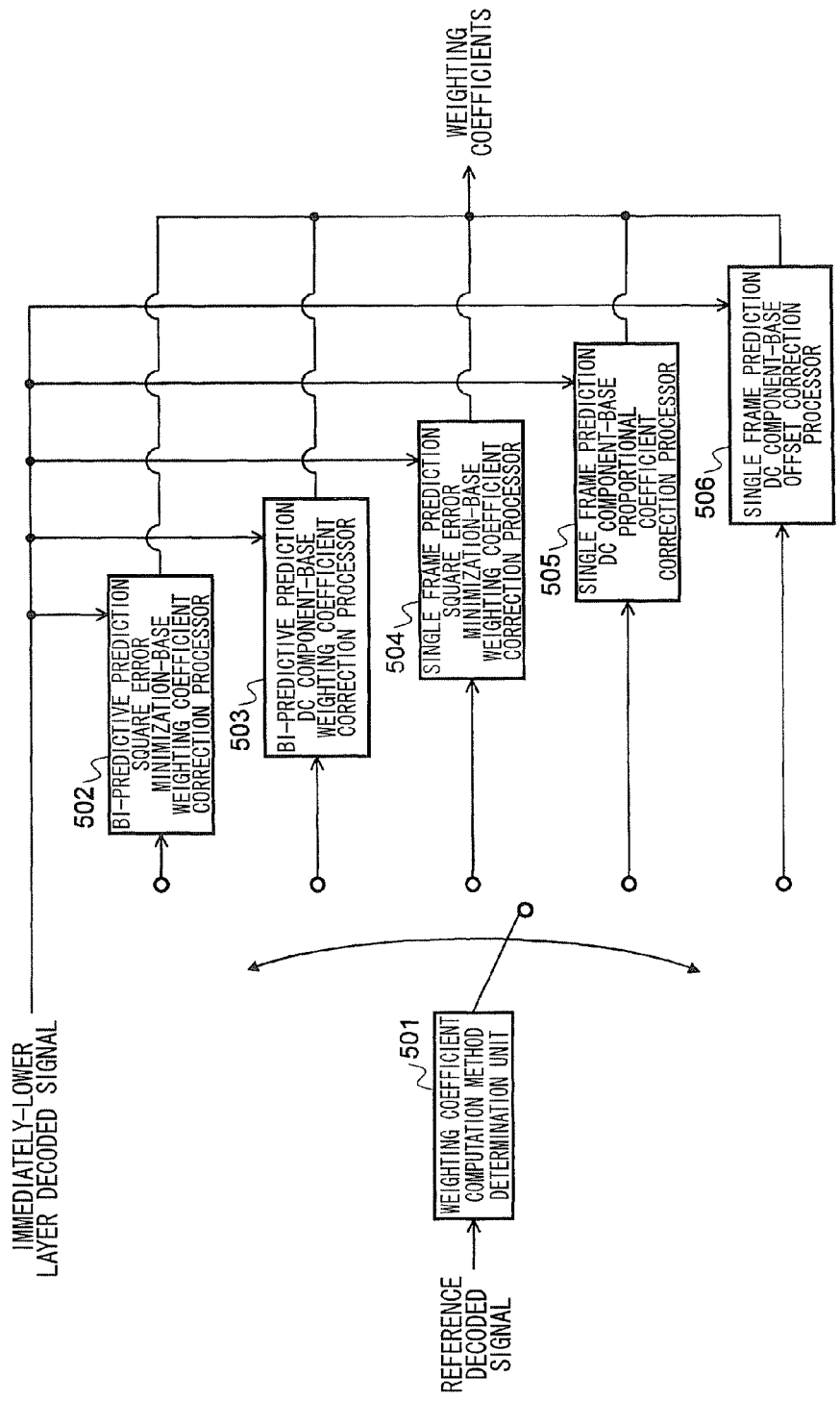
FIG. 17 is a diagram showing an example of the structure of a weighting coefficient computation unit.

An example structure of the weighting coefficient computation unit 302 in FIG. 15 and the weighting coefficient computation unit 402 in FIG. 16 is shown in FIG. 17. That is, FIG. 17 is a diagram showing an apparatus which applies weighting coefficient computation to a macroblock in the relevant enhancement layer.

Weighting coefficient computation method determination unit 501: It connects with a processor which executes weighting coefficient computation in accordance with a weighting coefficient computation method designated by an external device.

Examples of how to provide the designation information of the weighting coefficient computation method from an external device are (i) to initially define the method as a setting condition of the encoding process and store it in a picture parameter set, and (ii) to select an appropriate method for each slice by means of multi-pass processing.

Figure 18:
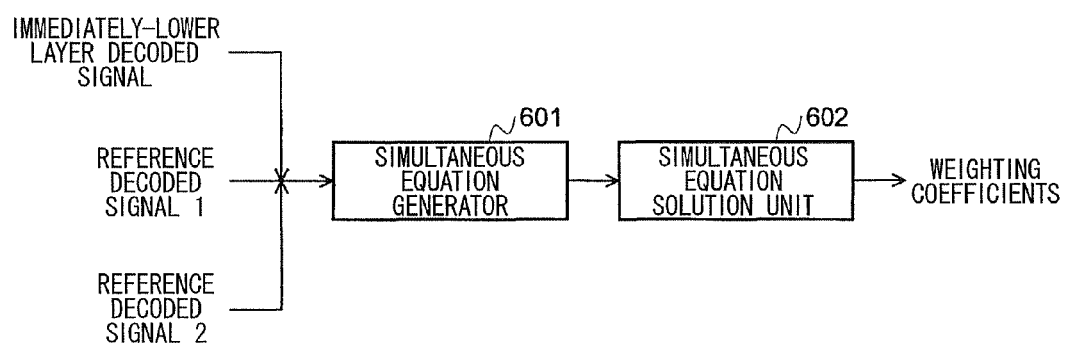
FIG. 18 is a diagram showing an example of the structure of a bi-predictive prediction square error minimization-base weighting coefficient correction processor.

Bi-predictive prediction square error minimization-base weighting coefficient correction processor 502: It receives decoded signals of the relevant two corrected macroblocks and a decoded signal of the correction target macroblock in the immediately-lower layer, and computes and outputs weighting coefficients using the method of least squares. FIG. 18 shows a detailed structure of this processor, and the above process is performed using the above-described formulas (16) and (17).

Figure 19:
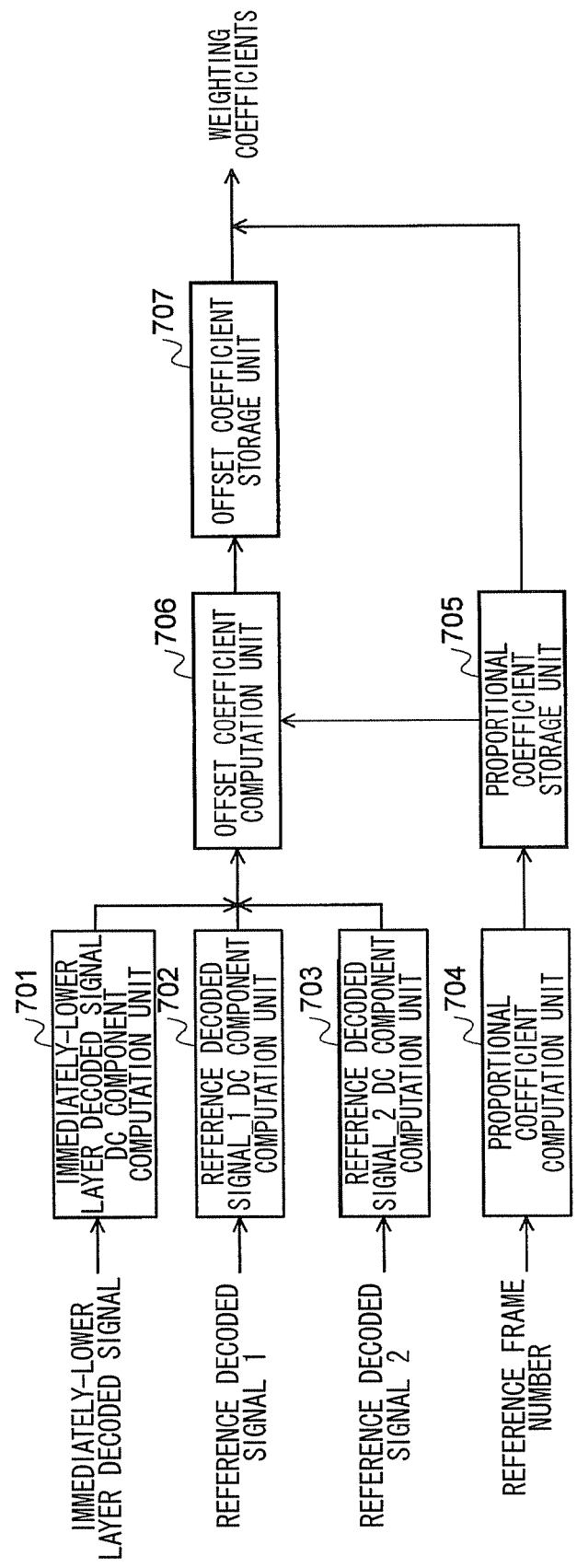
FIG. 19 is a diagram showing an example of the structure of a bi-predictive prediction DC component-base weighting coefficient correction processor.

Bi-predictive prediction DC component-base weighting coefficient correction processor 503: It receives the decoded signals of the two corrected macroblocks and the decoded signal of the correction target macroblock in the immediately-lower layer, and computes and outputs weighting coefficients using the DC components of the retrieved signals. FIG. 19 shows a detailed structure of this processor, and the above process is performed using the above-described formulas (13) to (15).

Single frame prediction square error minimization-base weighting coefficient correction processor 504: It receives a decoded signal of the relevant corrected macroblock and the decoded signal of the correction target macroblock in the immediately-lower layer, and computes and outputs weighting coefficients for minimizing the square error between a corrected signal formed by the decoded signal of the corrected macroblock and the decoded signal of the correction target macroblock in the immediately-lower layer. This process is performed using the above-described formulas (8) and (9).

Single frame prediction DC component-base proportional coefficient correction processor 505: It receives the decoded signal of the corrected macroblock and the decoded signal of the correction target macroblock in the immediately-lower layer, computes the DC component of each relevant block, computes a ratio between both DC components, and outputs the ratio as a proportional coefficient. The above process is performed using the above-described formulas (4) and (5).

Single frame prediction DC component-base offset correction processor 506: It receives the decoded signal of the corrected macroblock and the decoded signal of the correction target macroblock in the immediately-lower layer, computes the DC component of each relevant block, computes a difference between both DC components, and outputs the difference as an offset coefficient. This process is performed using the above-described formulas (6) and (7).

FIG. 18 is a diagram showing an example structure of the bi-predictive prediction square error minimization-base weighting coefficient correction processor 502 in FIG. 17. Below, the operation of the bi-predictive prediction square error minimization-base weighting coefficient correction processor 502 will be explained with reference to FIG. 18.

Simultaneous equation generator 601: It retrieves the decoded signal of the correction target macroblock in the immediately-lower layer and the decoded signals of the two corrected macroblocks, and generates a simultaneous equation for acquiring the least square error between a corrected signal fowled by the decoded signals (i.e., reference decoded signals) of the two corrected macroblocks and the decoded signal of the macroblock in the immediately-lower layer. The generated simultaneous equation is output to a simultaneous equation solution unit 602.

Simultaneous equation solution unit 602: It receives the simultaneous equation output from the simultaneous equation generator 601, and obtains the solution thereof, thereby computing a proportional coefficient and an offset coefficient, which are output. The solution may be obtained using a Gauss elimination method. The above process is performed using the above-described formulas (16) and (17).

FIG. 19 is a diagram showing an example structure of the bi-predictive prediction DC component-base weighting coefficient correction processor 503 in FIG. 17. Below, the operation of the bi-predictive prediction DC component-base weighting coefficient correction processor 503 will be explained with reference to FIG. 19.

Immediately-lower layer decoded signal DC component computation unit 701: It retrieves the decoded signal of the macroblock in the immediately-lower layer from the relevant buffer, computes the DC component thereof, and stores the DC component in a register.

Reference decoded signal_1 DC component computation unit 702: It retrieves the decoded signal of one corrected macroblock from the relevant buffer, computes the DC component thereof, and stores the DC component in a register.

Reference decoded signal_2 DC component computation unit 703: It retrieves the decoded signal of the corrected macroblock other than that processed by the reference decoded signal_1 DC component computation unit 702 from the relevant buffer, computes the DC component thereof, and stores the DC component in a register.

Proportional coefficient computation unit 704: It retrieves a reference frame number, computes a proportional coefficient, and outputs the proportional coefficient to a proportional coefficient storage unit 705.

Offset coefficient computation unit 706: It retrieves each DC component from the relevant register, and the proportional coefficient from the proportional coefficient storage unit 705, and computes an offset coefficient, which is output to an offset coefficient storage unit 707. The offset coefficient is computed using the formulas (13) to (15).

Figure 20:
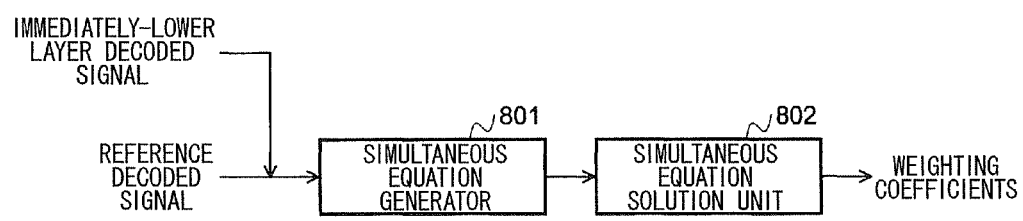
FIG. 20 is a diagram showing an example of the structure of a single frame prediction square error minimization-base weighting coefficient correction processor.

FIG. 20 is a diagram showing an example structure of the single frame prediction square error minimization-base weighting coefficient correction processor 504 in FIG. 17. Below, the operation of the single frame prediction square error minimization-base weighting coefficient correction processor 504 will be explained with reference to FIG. 20.

Simultaneous equation generator 801: It retrieves the decoded signal of the correction target macroblock in the immediately-lower layer and the decoded signal of the corrected macroblock, and generates a simultaneous equation for acquiring the least square error between a corrected signal formed by the decoded signal of the corrected macroblock and the decoded signal of the macroblock in the immediately-lower layer. The generated simultaneous equation is output to a simultaneous equation solution unit 802.

Simultaneous equation solution unit 802: It receives the simultaneous equation output from the simultaneous equation generator 801, and obtains the solution thereof, thereby computing a proportional coefficient and an offset coefficient, which are output. The solution may be obtained using a Gauss elimination method. The above process is performed using the above-described formulas (8) and (9).

Figure 21:
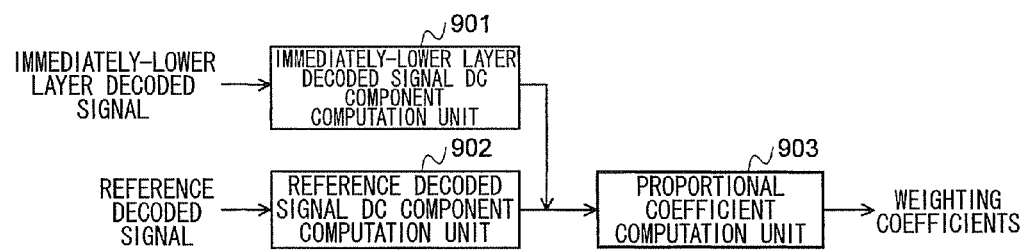
FIG. 21 is a diagram showing an example of the structure of a single frame prediction DC component-base proportional coefficient correction processor.

FIG. 21 is a diagram showing an example structure of the single frame prediction DC component-base proportional coefficient correction processor 505 in FIG. 17. Below, the operation of the single frame prediction DC component-base proportional coefficient correction processor 505 will be explained with reference to FIG. 21.

Immediately-lower layer decoded signal DC component computation unit 901: It retrieves the decoded signal of the macroblock in the immediately-lower layer from the relevant buffer, computes the DC component thereof, and stores the DC component in a register.

Reference decoded signal DC component computation unit 902: It retrieves the decoded signal of the corrected macroblock from the relevant buffer, computes the DC component thereof, and stores the DC component in a register.

Proportional coefficient computation unit 903: It retrieves the two DC component values from the registers, computes a ratio between both DC components, and outputs the ratio as a proportional coefficient. This process is performed using the above-described formulas (4) and (5).

Figure 22:
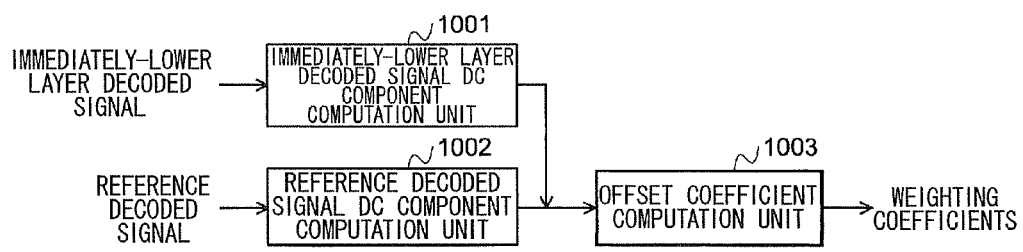
FIG. 22 is a diagram showing an example of the structure of a single frame prediction DC component-base offset correction processor.

FIG. 22 is a diagram showing an example structure of the single frame prediction DC component-base offset correction processor 506 in FIG. 17. Below, the operation of the single frame prediction DC component-base offset correction processor 506 will be explained with reference to FIG. 22.

Immediately-lower layer decoded signal DC component computation unit 1001: It retrieves the decoded signal of the macroblock in the immediately-lower layer from the relevant buffer, computes the DC component thereof, and stores the DC component in a register.

Reference decoded signal DC component computation unit 1002: It retrieves the decoded signal of the corrected macroblock from the relevant buffer, computes the DC component thereof, and stores the DC component in a register.

Offset coefficient computation unit 1003: It retrieves the two DC component values from the registers, computes a difference between both DC components, and outputs the difference as an offset coefficient. This process is performed using the above-described formulas (6) and (7).

The above-described scalable video encoding and decoding operations can be implemented, not only by hardware or firmware resources, but also be a computer and a software program. Such a program may be provided by storing it in a computer-readable storage medium, or by means of a network.

Experiment

In order to verify the effects of the present invention, a method in accordance with the present invention was applied to JSVC reference software JSVM 8.0 (see Non-Patent Document 3), so as to compare the method of the present invention with the Implicit mode of JSVM. In both method, the decoder performed multi-loop decoding. In addition, in both methods, motion estimation was limitedly executed with an integral accuracy. Under the above-described conditions, the effects were verified for fading and flash images.

Below, in the weighting coefficient computation method for the bi-predictive prediction of B slices, an example experiment of the weighting coefficient correction using the DC component block in the bi-predictive prediction (explained in Method 2-1) is shown. Similar preferable verification results were obtained when using any other method in accordance with the present invention.

Verification Results for Fading Images

Table 2 shows the conditions of the experiment.

TABLE 2

| conditions of experiment for fading images | |
|---|---|
| Sequence | City, Foreman, Soccer |
| Num. of Frames | 33 frames (white fade-in mixed) |
| Resolution | (BL) QCIF (EL) CIF |
| Frame Rate | 30 fps |
| GOP | 16 (Hierarchical B) |
| QP | 21, 24, 27, 30 |
| WP | (P-Slice) off (B-Siice) on |

In the experiment, (fade-mixed) images obtained by applying a white fade-in effect (over 33 pictures) to each of three types of JSVC standard images were used. Such white fade-mixed images were generated as follows:

$$g(t)=(1-f(t))a(t)+f(t)b(t)$$

In the above formula, g(t) indicates a fade-in image, a(t) indicates a single color (white) image, b(t) indicates the original image, and f(t) is a function for computing a mixing coefficient.

In the present experiment, two types of f(t) were used; one was f(t)=t/T (Linear fade), and the other was f(t)=(t/T)$^2$ (Quadratic fade). Here, T indicates a fade section. The 33 fading images were encoding targets, and one frame corresponded to one slice.

Table 3 shows the results of the experiment

TABLE 3

| B picture encoding performance for fading images | | | |
|---|---|---|---|
| Sequence | Fade | BD-bit [%] | BD-snr [dB] |
| City | Linear | −1.23 | 0.038 |
|  | Quadratic | −6.28 | 0.215 |
| Foreman | Linear | −0.03 | 0.001 |
|  | Quadratic | −6.15 | 0.187 |
| Soccer | Linear | −0.50 | 0.018 |
|  | Quadratic | −2.34 | 0.095 |

As the criteria for evaluating the performance, "Bjontegaard Delta" in the following document was used: G. Bjontegaard: "Calculation of average PNSR differences between RD-curves", ITU-T SG16 Q.6, VCEG, VCEG-M33, pp. 1-4, 2001. This is a method for computing differences in the amount of code and PSNR (peak signal to noise ratio) between two RD curves.

In table 3, for the method of the present invention, "BD-bit" and "BD-snr" respectively indicate an increasing rate of the amount of code and an increasing rate of the PSNR from DSVM for B pictures. The present invention implemented (i) a reduction of 0.59% (average) in the amount of code and an improvement of 0.019 dB in the SN ratio for the Liner-fade images, and (ii) a reduction of 4.92% (average) in the amount of code and an improvement of 0.166 dB in the SN ratio for the Quadratic-fade images FIG. 23 shows a temporal variation in BD-bit between Quadratic-fading B pictures for the JSVC standard image "City".

Figure 24:
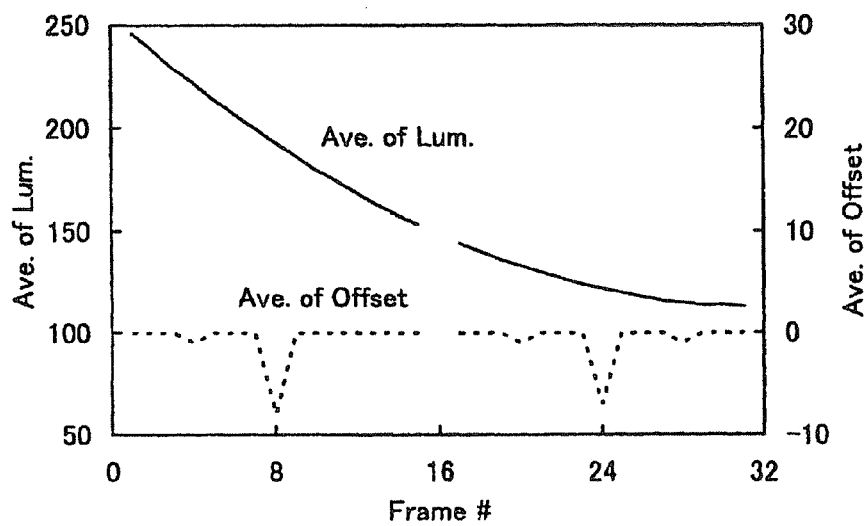
FIG. 24 is a diagram showing variations in an average luminance and an average offset coefficient (as experimental examples) for fading images.

FIG. 24 shows a temporal variation in an average luminance (Ave. of Lum.) for fade-mixed "City" images and a temporal variation in an average offset coefficient (Ave. of Offset) obtained when encoding the fade-mixed images using a QP (quantization parameter) of 24.

Due to a hierarchical B picture structure, the lower the temporal level of the relevant B frame, the larger the deviation from a linear form for the luminance variation from the reference signal, so that the present invention is more effective.

Figure 23:
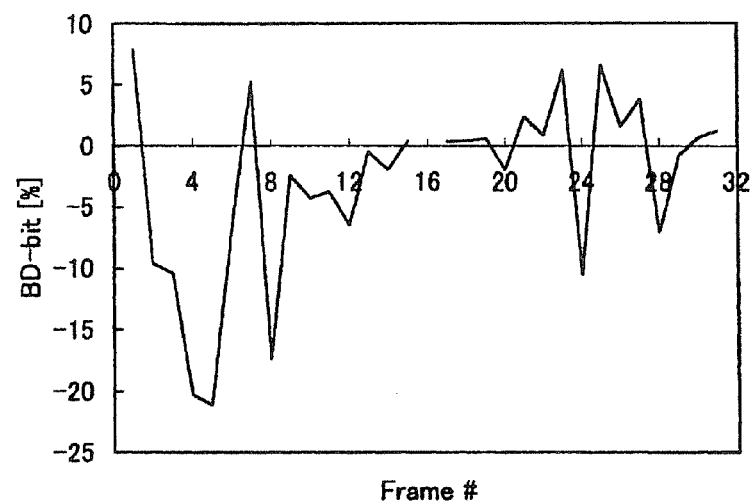
FIG. 23 is a diagram showing a variation in BD-bit (as an experimental example) for fading images.

Referring to FIG. 23, it can be confirmed that a large reduction (by more than 10%) in the amount of code was implemented for B frames having a relatively low temporal level.

In such a case, it can also be confirmed by referring to FIG. 24 that a non-zero value as the offset coefficient was output, which indicates that the offset coefficient could preferably correct the luminance variation.

Verification Results for Flash Images

For flash images, a JSVC standard image "Crew" was employed and 300 pictures were encoded, where GOP (group of pictures) was 8. The other experiment conditions were the same as those shown in Table 2.

Figure 25:
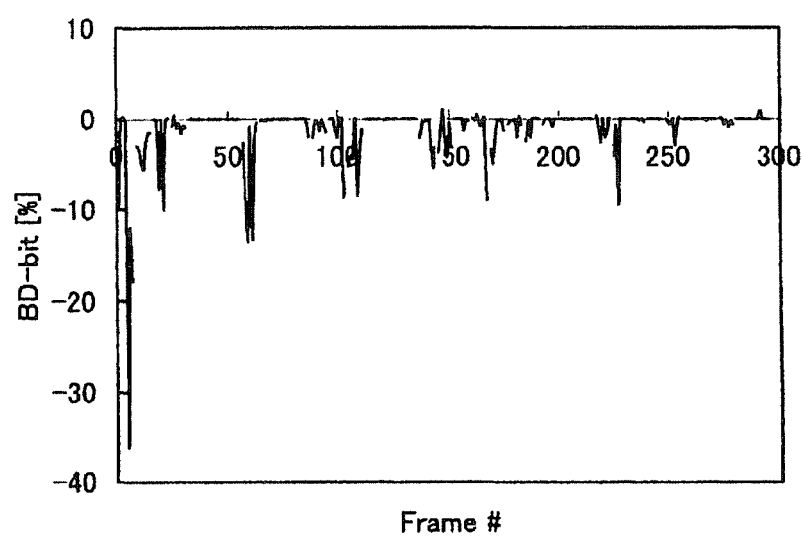
FIG. 25 is a diagram showing a variation in BD-bit (as an experimental example) for flash images.
Figure 26:
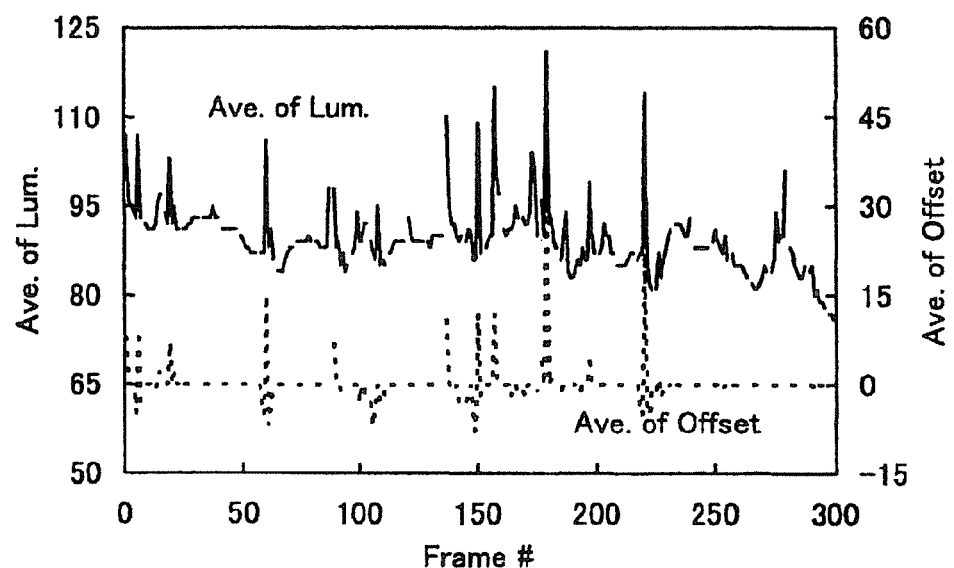
FIG. 26 is a diagram showing variations in an average luminance and an average offset coefficient (as experimental examples) for flash images.

FIG. 25 shows a temporal variation in BD-bit for B pictures, and FIG. 26 shows the average luminance of the original images and a temporal variation in the average offset coefficients when encoding the images using a QP of 24.

In FIG. 26, each frame (called "flash frame") having a sudden change in the average luminance had a flash. In addition, each frame to which the Implicit mode in accordance with the present invention was not applied to had an offset coefficient of zero.

Referring to FIG. 25, it can be confirmed that a reduction by approximately 10% (maximum 36.2%) in the amount of code was implemented for flash frames and frames in the vicinity thereof. For the whole B pictures in the relevant sequence, BD-bit=−1.14%, and BD-snr=0.043 dB.

When collating the luminance signal with the offset coefficient, similar to the variation in BD-bit, it can be confirmed that non-zero offset coefficients were computed for the flash frames and the frames in the vicinity thereof.

To each flash frame, a positive offset coefficient corresponding to an increase in the luminance was assigned. For each frame (in the vicinity of the relevant flash frame) which referred to the flash frame for prediction, deviation from a linear prediction due to the reference to the flash frame having a high luminance was corrected using a negative offset coefficient.

It can also be confirmed that the computed offset coefficients preferably corrected the flash images.

INDUSTRIAL APPLICABILITY

In accordance with the present invention, weighting coefficients can be computed for each desired local area. Therefore, even when the brightness changes in a part of an image due to a shadow of an moving object or the like, accurate weighted motion prediction can be embodiment by means of the Implicit mode which performs no weighting coefficient transmission.

Also in the L0/L1 prediction for P and B slices, which conventionally has only the Explicit mode, it is possible to perform weighted motion prediction by means of the Implicit mode.

Additionally, in accordance with the correction in consideration of brightness information of the immediately-lower layer, even for images (e.g., images having a flash and fading images having a non-linear variation) having a non-linear brightness change between an encoding or decoding target frame and prediction reference frames, it is possible to perform weighted motion prediction by means of the Implicit mode. In accordance with such an improvement in the performance of the weighted motion prediction, the encoding efficiency can be improved.

The invention claimed is:

1. A scalable video encoding method of performing encoding by predicting an upper-layer signal having a relatively high spatial resolution by means of interpolation using an immediately-lower-layer signal having a relatively low spatial resolution, the method comprising:

a step that computes a first weighting coefficient for each image area of a predetermined unit size in a search for estimating a motion between an encoding target image area in an upper layer and a reference image area, where the first weighting coefficient is computed based on a brightness variation between an image area, which belongs to an immediately-lower layer and has the same spatial position as the encoding target image area, and the reference image area;

a step that performs a motion estimation using a signal which is obtained by correcting a decoded signal of the reference image area by the first weighting coefficient and functions as an estimated signal in the motion estimation, so as to compute a motion vector;

a step that retrieves the computed motion vector, and computes a second weighting coefficient based on a brightness variation between a reference image area indicated by the motion vector and the image area which belongs to the immediately-lower layer and has the same spatial position as the encoding target image area; and a step that determines a signal, which is obtained by correcting a decoded signal of the reference image area indicated by the motion vector by using the second weighting coefficient, to be a compensated signal in motion compensation, which functions as a predicted signal of the encoding target image area.

2. The scalable video encoding method in accordance with claim 1, wherein:

in each of the step that computes the first weighting coefficient and the step that computes the second weighting coefficient, when the reference image area is one area, the weighting coefficient is computed by determining a ratio between a DC component of the reference image area and a DC component of the image area which belongs to the immediately-lower layer and has the same spatial position as the encoding target image area to be a proportional coefficient, and by setting an offset coefficient to be zero.

3. The scalable video encoding method in accordance with claim 1, wherein:

in each of the step that computes the first weighting coefficient and the step that computes the second weighting coefficient, when the reference image area is one area, the weighting coefficient is computed by determining a difference between a DC component of the reference image area and a DC component of the image area which belongs to the immediately-lower layer and has the same spatial position as the encoding target image area to be an offset coefficient, and by setting a proportional coefficient to be 1.

4. The scalable video encoding method in accordance with claim 1, wherein:
in each weighting coefficient computing step, when the reference image area is one area, the computed weighting coefficient minimizes a square error between a signal obtained by up-sampling a decoded signal of the image area, which belongs to the immediately-lower layer and has the same spatial position as the encoding target image area, to have a spatial resolution of the current layer and a corrected signal obtained by correcting a decoded signal of the reference image area by the weighting coefficient.

5. The scalable video encoding method in accordance with claim 1, wherein:
in each weighting coefficient computing step, when there are two of the reference image areas, weighting coefficient computation is performed in a manner such that proportional coefficients are computed in accordance with an inter-frame distance between the encoding target image area and each reference image area, and an offset coefficient is computed by subtracting values, which are obtained by respectively multiplying DC components of the two reference image areas by the proportional coefficients, from a DC component of the image area which belongs to the immediately-lower layer and has the same spatial position as the encoding target image area.

6. The scalable video encoding method in accordance with claim 1, wherein:
in each weighting coefficient computing step, when there are two of the reference image areas, weighting coefficients are computed which minimize a square error between a signal obtained by up-sampling a decoded signal of the image area, which belongs to the immediately-lower layer and has the same spatial position as the encoding target image area, to have a spatial resolution of the current layer and a corrected signal obtained by correcting decoded signals of the two reference image areas by the weighting coefficients.

7. The scalable video encoding method in accordance with claim 1, wherein in each weighting coefficient computing step, when the reference image area is one area, the weighting coefficient is computed by determining a ratio between a DC component of the reference image area and another component to be a proportional coefficient, and by setting an offset coefficient to be zero, where said other component is one of:
a DC component of an image area obtained by up-sampling the image area which belongs to the immediately-lower layer and has the same spatial position as the encoding target image area;
a component obtained by correcting the DC component of the image area, which belongs to the immediately-lower layer and has the same spatial position as the encoding target image area, by using a DC-component relationship between the reference image area and a corresponding image area in the immediately-lower layer;
a component obtained by correcting the DC component of the image area, which belongs to the immediately-lower layer and has the same spatial position as the encoding target image area, by using a DC-component relationship between the reference image area and an image area obtained by up-sampling an image area corresponding to the reference image area in the immediately-lower layer;
a component obtained by correcting a DC component of an image area, which is obtained by up-sampling the image area which belongs to the immediately-lower layer and has the same spatial position as the encoding target image area, by using a DC-component relationship between the reference image area and a corresponding image area in the immediately-lower layer; and
a component obtained by correcting a DC component of an image area, which is obtained by up-sampling the image area which belongs to the immediately-lower layer and has the same spatial position as the encoding target image area, by using a DC-component relationship between the reference image area and an image area obtained by up-sampling an image area corresponding to the reference image area in the immediately-lower layer.

8. The scalable video encoding method in accordance with claim 1, wherein in each weighting coefficient computing step, when there are two of the reference image areas, weighting coefficient computation is performed in a manner such that proportional coefficients are computed in accordance with an inter-frame distance between the encoding target image area and each reference image area, and an offset coefficient is computed by subtracting values, which are obtained by respectively multiplying DC components of the two reference image areas by the proportional coefficients, from another component which is one of:
a DC component of an image area obtained by up-sampling the image area which belongs to the immediately-lower layer and has the same spatial position as the encoding target image area;
a component obtained by correcting the DC component of the image area, which belongs to the immediately-lower layer and has the same spatial position as the encoding target image area, by using a DC-component relationship between any one of the reference image areas and a corresponding image area in the immediately-lower layer;
a component obtained by correcting the DC component of the image area, which belongs to the immediately-lower layer and has the same spatial position as the encoding target image area, by using a DC-component relationship between any one of the reference image areas and an image area obtained by up-sampling an image area corresponding to the relevant reference image area in the immediately-lower layer;
a component obtained by correcting a DC component of an image area, which is obtained by up-sampling the image area which belongs to the immediately-lower layer and has the same spatial position as the encoding target image area, by using a DC-component relationship between any one of the reference image areas and a corresponding image area in the immediately-lower layer; and
a component obtained by correcting a DC component of an image area, which is obtained by up-sampling the image area which belongs to the immediately-lower layer and has the same spatial position as the encoding target image area, by using a DC-component relationship between any one of the reference image areas and an image area obtained by up-sampling an image area corresponding to the relevant reference image area in the immediately-lower layer.

9. The scalable video encoding method in accordance with claim 1, wherein in each weighting coefficient computing step, when the reference image area is one area, the computed weighting coefficient minimizes a square error between a corrected signal obtained by correcting a decoded signal of the reference image area by the weighting coefficient and another signal which is one of:

a signal obtained by correcting the up-sampled signal by using a decoded-signal relationship between the reference image area and a corresponding image area in the immediately-lower layer; and a signal obtained by correcting the up-sampled signal by using a relationship between the reference image area and a signal obtained by up-sampling a decoded signal of a corresponding image area in the immediately-lower layer to have the spatial resolution of the current layer.

10. The scalable video encoding method in accordance with claim 1, wherein in each weighting coefficient computing step, when there are two of the reference image areas, weighting coefficients are computed which minimize a square error between a corrected signal obtained by correcting decoded signals of the two reference image areas by the weighting coefficients and another signal which is one of:

a signal obtained by correcting the up-sampled signal by using a decoded-signal relationship between any one of the reference image areas and a corresponding image area in the immediately-lower layer; and a signal obtained by correcting the up-sampled signal by using a relationship between any one of the reference image areas and a signal obtained by up-sampling a decoded signal of a corresponding image area in the immediately-lower layer to have the spatial resolution of the current layer.

11. A scalable video decoding method of performing decoding by predicting an upper-layer signal having a relatively high spatial resolution by means of interpolation using an immediately-lower-layer signal having a relatively low spatial resolution, the method comprising:

a step that decodes encoded data for each image area of a predetermined unit size, retrieves a decoded motion vector, and computes a weighting coefficient based on a brightness variation between an image area, which has the same spatial position as a decoding target image area in an upper layer and belongs to an immediately-lower layer, and a reference image area indicated by the motion vector; and a step that determines a signal, which is obtained by correcting a decoded signal of the reference image area indicated by the motion vector by using the weighting coefficient, to be a compensated signal in motion compensation, which functions as a predicted signal of the decoding target image area.

12. The scalable video decoding method in accordance with claim 11, wherein:

in the weighting coefficient computing step, when the reference image area is one area, the weighting coefficient is computed by determining a ratio between a DC component of the reference image area and a DC component of the image area which belongs to the immediately-lower layer and has the same spatial position as the decoding target image area to be a proportional coefficient, and by setting an offset coefficient to be zero.

13. The scalable video decoding method in accordance with claim 11, wherein:

in the weighting coefficient computing step, when the reference image area is one area, the weighting coefficient is computed by determining a difference between a DC component of the reference image area and a DC component of the image area which belongs to the immediately-lower layer and has the same spatial position as the decoding target image area to be an offset coefficient, and by setting a proportional coefficient to be 1.

14. The scalable video decoding method in accordance with claim 11, wherein:

in the weighting coefficient computing step, when the reference image area is one area, the computed weighting coefficient minimizes a square error between a signal obtained by up-sampling a decoded signal of the image area, which belongs to the immediately-lower layer and has the same spatial position as the decoding target image area, to have a spatial resolution of the current layer and a corrected signal obtained by correcting a decoded signal of the reference image area by the weighting coefficient.

15. The scalable video decoding method in accordance with claim 11, wherein:

in the weighting coefficient computing step, when there are two of the reference image areas, weighting coefficient computation is performed in a manner such that proportional coefficients are computed in accordance with an inter-frame distance between the decoding target image area and each reference image area, and an offset coefficient is computed by subtracting values, which are obtained by respectively multiplying DC components of the two reference image areas by the proportional coefficients, from a DC component of the image area which belongs to the immediately-lower layer and has the same spatial position as the decoding target image area.

16. The scalable video decoding method in accordance with claim 11, wherein:

in the weighting coefficient computing step, when there are two of the reference image areas, weighting coefficients are computed which minimize a square error between a signal obtained by up-sampling a decoded signal of the image area, which belongs to the immediately-lower layer and has the same spatial position as the decoding target image area, to have a spatial resolution of the current layer and a corrected signal obtained by correcting decoded signals of the two reference image areas by the weighting coefficients.

17. The scalable video decoding method in accordance with claim 11, wherein in the weighting coefficient computing step, when the reference image area is one area, the weighting coefficient is computed by determining a ratio between a DC component of the reference image area and another component to be a proportional coefficient, and by setting an offset coefficient to be zero, where said other component is one of:

a DC component of an image area obtained by up-sampling the image area which belongs to the immediately-lower layer and has the same spatial position as the decoding target image area;

a component obtained by correcting the DC component of the image area, which belongs to the immediately-lower layer and has the same spatial position as the decoding target image area, by using a DC-component relationship between the reference image area and a corresponding image area in the immediately-lower layer;

a component obtained by correcting the DC component of the image area, which belongs to the immediately-lower layer and has the same spatial position as the decoding target image area, by using a DC-component relationship between the reference image area and an image area obtained by up-sampling an image area corresponding to the reference image area in the immediately-lower layer;

a component obtained by correcting a DC component of an image area, which is obtained by up-sampling the image area which belongs to the immediately-lower layer and has the same spatial position as the decoding target image area, by using a DC-component relationship between the reference image area and a corresponding image area in the immediately-lower layer; and a component obtained by correcting a DC component of an image area, which is obtained by up-sampling the image area which belongs to the immediately-lower layer and has the same spatial position as the decoding target image area, by using a DC-component relationship between the reference image area and an image area obtained by up-sampling an image area corresponding to the reference image area in the immediately-lower layer.

18. The scalable video decoding method in accordance with claim 11, wherein in the weighting coefficient computing step, when there are two of the reference image areas, weighting coefficient computation is performed in a manner such that proportional coefficients are computed in accordance with an inter-frame distance between the decoding target image area and each reference image area, and an offset coefficient is computed by subtracting values, which are obtained by respectively multiplying DC components of the two reference image areas by the proportional coefficients, from another component which is one of:

a DC component of an image area obtained by up-sampling the image area which belongs to the immediately-lower layer and has the same spatial position as the decoding target image area;

a component obtained by correcting the DC component of the image area, which belongs to the immediately-lower layer and has the same spatial position as the decoding target image area, by using a DC-component relationship between any one of the reference image areas and a corresponding image area in the immediately-lower layer;

a component obtained by correcting the DC component of the image area, which belongs to the immediately-lower layer and has the same spatial position as the decoding target image area, by using a DC-component relationship between any one of the reference image areas and an image area obtained by up-sampling an image area corresponding to the relevant reference image area in the immediately-lower layer;

a component obtained by correcting a DC component of an image area, which is obtained by up-sampling the image area which belongs to the immediately-lower layer and has the same spatial position as the decoding target image area, by using a DC-component relationship between any one of the reference image areas and a corresponding image area in the immediately-lower layer; and a component obtained by correcting a DC component of an image area, which is obtained by up-sampling the image area which belongs to the immediately-lower layer and has the same spatial position as the decoding target image area, by using a DC-component relationship between any one of the reference image areas and an image area obtained by up-sampling an image area corresponding to the relevant reference image area in the immediately-lower layer.

19. The scalable video decoding method in accordance with claim 11, wherein in the weighting coefficient computing step, when the reference image area is one area, the computed weighting coefficient minimizes a square error between a corrected signal obtained by correcting a decoded signal of the reference image area by the weighting coefficient and another signal which is one of:

a signal obtained by correcting the up-sampled signal by using a decoded-signal relationship between the reference image area and a corresponding image area in the immediately-lower layer; and a signal obtained by correcting the up-sampled signal by using a relationship between the reference image area and a signal obtained by up-sampling a decoded signal of a corresponding image area in the immediately-lower layer to have the spatial resolution of the current layer.

20. The scalable video decoding method in accordance with claim 11, wherein in the weighting coefficient computing step, when there are two of the reference image areas, weighting coefficients are computed which minimize a square error between a corrected signal obtained by correcting decoded signals of the two reference image areas by the weighting coefficients and another signal which is one of:

a signal obtained by correcting the up-sampled signal by using a decoded-signal relationship between any one of the reference image areas and a corresponding image area in the immediately-lower layer; and a signal obtained by correcting the up-sampled signal by using a relationship between any one of the reference image areas and a signal obtained by up-sampling a decoded signal of a corresponding image area in the immediately-lower layer to have the spatial resolution of the current layer.

21. A scalable video encoding apparatus of performing encoding by predicting an upper-layer signal having a relatively high spatial resolution by means of interpolation using an immediately-lower-layer signal having a relatively low spatial resolution, the apparatus comprising:

a device that computes a first weighting coefficient for each image area of a predetermined unit size in a search for estimating a motion between an encoding target image area in an upper layer and a reference image area, where the first weighting coefficient is computed based on a brightness variation between an image area, which belongs to an immediately-lower layer and has the same spatial position as the encoding target image area, and the reference image area;

a device that performs a motion estimation using a signal which is obtained by correcting a decoded signal of the reference image area by the first weighting coefficient and functions as an estimated signal in the motion estimation, so as to compute a motion vector;

a device that retrieves the computed motion vector, and computes a second weighting coefficient based on a brightness variation between a reference image area indicated by the motion vector and the image area which belongs to the immediately-lower layer and has the same spatial position as the encoding target image area; and a device that determines a signal, which is obtained by correcting a decoded signal of the reference image area indicated by the motion vector by using the second weighting coefficient, to be a compensated signal in motion compensation, which functions as a predicted signal of the encoding target image area.

22. The scalable video encoding apparatus in accordance with claim 21, wherein:

in each of the device that computes the first weighting coefficient and the device that computes the second weighting coefficient, when the reference image area is one area, the weighting coefficient is computed by determining a ratio between a DC component of the reference image area and a DC component of the image area which belongs to the immediately-lower layer and has the same spatial position as the encoding target image area to be a proportional coefficient, and by setting an offset coefficient to be zero.

23. The scalable video encoding apparatus in accordance with claim 21, wherein:
in each of the device that computes the first weighting coefficient and the device that computes the second weighting coefficient, when the reference image area is one area, the weighting coefficient is computed by determining a difference between a DC component of the reference image area and a DC component of the image area which belongs to the immediately-lower layer and has the same spatial position as the encoding target image area to be an offset coefficient, and by setting a proportional coefficient to be 1.

24. The scalable video encoding apparatus in accordance with claim 21, wherein:
in each weighting coefficient computing device, when the reference image area is one area, the computed weighting coefficient minimizes a square error between a signal obtained by up-sampling a decoded signal of the image area, which belongs to the immediately-lower layer and has the same spatial position as the encoding target image area, to have a spatial resolution of the current layer and a corrected signal obtained by correcting a decoded signal of the reference image area by the weighting coefficient.

25. The scalable video encoding apparatus in accordance with claim 21, wherein:
in each weighting coefficient computing device, when there are two of the reference image areas, weighting coefficient computation is performed in a manner such that proportional coefficients are computed in accordance with an inter-frame distance between the encoding target image area and each reference image area, and an offset coefficient is computed by subtracting values, which are obtained by respectively multiplying DC components of the two reference image areas by the proportional coefficients, from a DC component of the image area which belongs to the immediately-lower layer and has the same spatial position as the encoding target image area.

26. The scalable video encoding apparatus in accordance with claim 21, wherein:
in each weighting coefficient computing device, when there are two of the reference image areas, weighting coefficients are computed which minimize a square error between a signal obtained by up-sampling a decoded signal of the image area, which belongs to the immediately-lower layer and has the same spatial position as the encoding target image area, to have a spatial resolution of the current layer and a corrected signal obtained by correcting decoded signals of the two reference image areas by the weighting coefficients.

27. A scalable video decoding apparatus of performing decoding by predicting an upper-layer signal having a relatively high spatial resolution by means of interpolation using an immediately-lower-layer signal having a relatively low spatial resolution, the apparatus comprising:
a device that decodes encoded data for each image area of a predetermined unit size, retrieves a decoded motion vector, and computes a weighting coefficient based on a brightness variation between an image area, which has the same spatial position as a decoding target image area in an upper layer and belongs to an immediately-lower layer, and a reference image area indicated by the motion vector; and
a device that determines a signal, which is obtained by correcting a decoded signal of the reference image area indicated by the motion vector by using the weighting coefficient, to be a compensated signal in motion compensation, which functions as a predicted signal of the decoding target image area.

28. The scalable video decoding apparatus in accordance with claim 27, wherein:
in the weighting coefficient computing device, when the reference image area is one area, the weighting coefficient is computed by determining a ratio between a DC component of the reference image area and a DC component of the image area which belongs to the immediately-lower layer and has the same spatial position as the decoding target image area to be a proportional coefficient, and by setting an offset coefficient to be zero.

29. The scalable video decoding apparatus in accordance with claim 27, wherein:
in the weighting coefficient computing device, when the reference image area is one area, the weighting coefficient is computed by determining a difference between a DC component of the reference image area and a DC component of the image area which belongs to the immediately-lower layer and has the same spatial position as the decoding target image area to be an offset coefficient, and by setting a proportional coefficient to be 1.

30. The scalable video decoding apparatus in accordance with claim 27, wherein:
in the weighting coefficient computing device, when the reference image area is one area, the computed weighting coefficient minimizes a square error between a signal obtained by up-sampling a decoded signal of the image area, which belongs to the immediately-lower layer and has the same spatial position as the decoding target image area, to have a spatial resolution of the current layer and a corrected signal obtained by correcting a decoded signal of the reference image area by the weighting coefficient.

31. The scalable video decoding apparatus in accordance with claim 27, wherein:
in the weighting coefficient computing device, when there are two of the reference image areas, weighting coefficient computation is performed in a manner such that proportional coefficients are computed in accordance with an inter-frame distance between the decoding target image area and each reference image area, and an offset coefficient is computed by subtracting values, which are obtained by respectively multiplying DC components of the two reference image areas by the proportional coefficients, from a DC component of the image area which belongs to the immediately-lower layer and has the same spatial position as the decoding target image area.

32. The scalable video decoding apparatus in accordance with claim 27, wherein:
in the weighting coefficient computing device, when there are two of the reference image areas, weighting coefficients are computed which minimize a square error between a signal obtained by up-sampling a decoded signal of the image area, which belongs to the immediately-lower layer and has the same spatial position as the decoding target image area, to have a spatial resolution of the current layer and a corrected signal obtained by correcting decoded signals of the two reference image areas by the weighting coefficients.

33. A non-transitory computer-readable storage medium which stores a scalable video encoding program by which a computer executes the scalable video encoding method in accordance with claim 1.

34. A non-transitory computer-readable storage medium which stores a scalable video decoding program by which a computer executes the scalable video decoding method in accordance with claim 11.

35. The scalable video encoding method in accordance with claim 1, wherein in each weighting coefficient computing step, when the reference image area is one area, the weighting coefficient is computed by determining a difference between a DC component of the reference image area and another component to be an offset coefficient, and by setting a proportional coefficient to be 1, where said other component is one of:

a DC component of an image area obtained by up-sampling the image area which belongs to the immediately-lower layer and has the same spatial position as the encoding target image area;

a component obtained by correcting the DC component of the image area, which belongs to the immediately-lower layer and has the same spatial position as the encoding target image area, by using a DC-component relationship between the reference image area and a corresponding image area in the immediately-lower layer;

a component obtained by correcting the DC component of the image area, which belongs to the immediately-lower layer and has the same spatial position as the encoding target image area, by using a DC-component relationship between the reference image area and an image area obtained by up-sampling an image area corresponding to the reference image area in the immediately-lower layer;

a component obtained by correcting a DC component of an image area, which is obtained by up-sampling the image area which belongs to the immediately-lower layer and has the same spatial position as the encoding target image area, by using a DC-component relationship between the reference image area and a corresponding image area in the immediately-lower layer; and a component obtained by correcting a DC component of an image area, which is obtained by up-sampling the image area which belongs to the immediately-lower layer and has the same spatial position as the encoding target image area, by using a DC-component relationship between the reference image area and an image area obtained by up-sampling an image area corresponding to the reference image area in the immediately-lower layer.

36. The scalable video decoding method in accordance with claim 11, wherein in the weighting coefficient computing step, when the reference image area is one area, the weighting coefficient is computed by determining a difference between a DC component of the reference image area and another component to be an offset coefficient, and by setting a proportional coefficient to be 1, where said other component is one of:

a DC component of an image area obtained by up-sampling the image area which belongs to the immediately-lower layer and has the same spatial position as the decoding target image area;

a component obtained by correcting the DC component of the image area, which belongs to the immediately-lower layer and has the same spatial position as the decoding target image area, by using a DC-component relationship between the reference image area and a corresponding image area in the immediately-lower layer;

a component obtained by correcting the DC component of the image area, which belongs to the immediately-lower layer and has the same spatial position as the decoding target image area, by using a DC-component relationship between the reference image area and an image area obtained by up-sampling an image area corresponding to the reference image area in the immediately-lower layer;

a component obtained by correcting a DC component of an image area, which is obtained by up-sampling the image area which belongs to the immediately-lower layer and has the same spatial position as the decoding target image area, by using a DC-component relationship between the reference image area and a corresponding image area in the immediately-lower layer; and a component obtained by correcting a DC component of an image area, which is obtained by up-sampling the image area which belongs to the immediately-lower layer and has the same spatial position as the decoding target image area, by using a DC-component relationship between the reference image area and an image area obtained by up-sampling an image area corresponding to the reference image area in the immediately-lower layer.

* * * * *